(12) United States Patent
Monteith et al.

(10) Patent No.: US 10,975,874 B2
(45) Date of Patent: Apr. 13, 2021

(54) CONNECTED FAN SYSTEMS

(71) Applicant: Hubbell Incorporated, Shelton, CT (US)

(72) Inventors: Shawn Monteith, Burlington, CT (US); Michael Tetreault, Simsbury, CT (US)

(73) Assignee: Hubbell Incorporated, Shelton, CT (US)

( * ) Notice: Subject to any disclaimer, the term of this patent is extended or adjusted under 35 U.S.C. 154(b) by 162 days.

(21) Appl. No.: 16/225,621

(22) Filed: Dec. 19, 2018

(65) Prior Publication Data

US 2019/0186496 A1 Jun. 20, 2019

Related U.S. Application Data

(60) Provisional application No. 62/640,313, filed on Mar. 8, 2018, provisional application No. 62/608,133, filed on Dec. 20, 2017.

(51) Int. Cl.
*F04D 25/08* (2006.01)
*F24F 1/0047* (2019.01)
(Continued)

(52) U.S. Cl.
CPC ......... *F04D 25/088* (2013.01); *F04D 27/004* (2013.01); *F24F 1/0047* (2019.02); *F24F 7/007* (2013.01); *F24F 11/0001* (2013.01)

(58) Field of Classification Search
CPC .. F04D 25/088; F04D 27/004; F24F 11/0001; F24F 1/0047; F24F 7/007
See application file for complete search history.

(56) References Cited

U.S. PATENT DOCUMENTS 5,189,412 A 2/1993 Mehta et al.
5,528,229 A 6/1996 Mehta
(Continued)

FOREIGN PATENT DOCUMENTS

WO WO 2015153604 10/2015
WO WO 2016109645 7/2016
WO WO 2016172181 10/2016

OTHER PUBLICATIONS

PCT International Search Report and Written Opinion for corresponding PCT Application No. PCT/US2018/066480, dated Mar. 21, 2019, 10 pages.

*Primary Examiner* — Sisay Yacob
(74) *Attorney, Agent, or Firm* — Michael Best & Friedrich, LLP

(57) ABSTRACT

Fan systems for circulating air in a space are provided. In one example implementation, a fan system includes a canopy controller configured to be disposed within a canopy housing of a ceiling fan. The canopy controller can be configured to control operation of a motor associated with the ceiling fan. The canopy controller can have a communication interface configured to communicate using a first wireless communication protocol. The fan system can include an in-wall controller. The in-wall controller being in electrical communication with the canopy controller via one or more electrical conductors. The in-wall controller can include an interface element configured to receive a user input. The in-wall controller can be configured to communicate one or more control commands to the canopy controller using the first wireless communication protocol. The in-wall controller configured to communicate data associated with the ceiling fan via a second wireless communication protocol.

18 Claims, 14 Drawing Sheets

(51) Int. Cl.
*F24F 7/007* (2006.01)
*F24F 11/00* (2018.01)
*F04D 27/00* (2006.01)

(56) References Cited

U.S. PATENT DOCUMENTS

| | | |
|---|---|---|
| 5,689,261 A | 11/1997 | Mehta et al. |
| 6,120,262 A | 9/2000 | McDonough et al. |
| 6,189,799 B1 | 2/2001 | Parker et al. |
| 6,967,565 B2 | 11/2005 | Lingemann |
| 7,197,011 B2 | 3/2007 | Fong |
| 7,555,556 B2 | 6/2009 | Motoyama |
| 8,031,270 B1 | 10/2011 | Wisniewski et al. |
| 8,122,135 B2 | 2/2012 | Motoyama |
| 9,413,171 B2 | 8/2016 | Neyhart |
| 2006/0044154 A1* | 3/2006 | Liao ............. G08C 23/04 340/13.24 |
| 2009/0066197 A1 | 3/2009 | Chen |
| 2010/0200664 A1* | 8/2010 | Drew ............. G01N 33/004 236/94 |
| 2012/0286940 A1* | 11/2012 | Carmen, Jr. ........ H05B 45/00 340/12.5 |
| 2014/0117859 A1* | 5/2014 | Swatsky ........... H05B 47/19 315/158 |
| 2015/0325112 A1 | 11/2015 | McPherson et al. |
| 2017/0115019 A1 | 4/2017 | Demet et al. |

\* cited by examiner

CONNECTED FAN SYSTEMS

PRIORITY CLAIM

The present application is based on and claims priority to U.S. Provisional App. No. 62/608,133, titled "Connected Fan Systems," having a filing date of Dec. 20, 2017, which is incorporated by reference herein. The present application is also based on and claims priority to U.S. Provisional App. No. 62/640,313, titled "Connected Fan Systems," having a filing date of Mar. 8, 2018.

FIELD

The present disclosure relates generally to fan systems.

BACKGROUND

Fans (e.g., ceiling fans) can be used to circulate air within a space. When a person occupies the room, circulating the air via operation of the ceiling fan can increase evaporation of moisture from the person's skin. In this way, the person's body temperature can be lowered. With the advance of Internet of Things (IoT) technology, in-home devices are configured to communicate over one or more communication links. For instance, devices can be capable of sending and/or receiving information using communication technologies, such as Bluetooth low energy, Bluetooth mesh networking, near-field communication, Wi-Fi, ZigBee, Ethernet, etc.

SUMMARY

Aspects and advantages of embodiments of the present disclosure will be set forth in part in the following description, or may be learned from the description, or may be learned through practice of the embodiments.

One example aspect of the present disclosure is directed to a fan system. The system can include a canopy controller configured to be disposed within a canopy housing of a ceiling fan. The canopy controller can be configured to control operation of a motor associated with the ceiling fan. The canopy controller can have a communication interface configured to communicate using a first wireless communication protocol. The system can include an in-wall controller. The in-wall controller can be in electrical communication with the canopy controller via one or more electrical conductors. The in-wall controller can include an interface element configured to receive a user input. The in-wall controller can be configured to communicate one or more control commands to the canopy controller using the first wireless communication protocol. The in-wall controller configured to communicate data associated with the ceiling fan via a second wireless communication protocol.

Another example aspect of the present disclosure is directed to a method for operating a fan system. The method includes obtaining, at an in-wall controller of the fan system, one or more signals indicative of a user input associated with controlling operation of a ceiling fan. The method includes, processing, at the in-wall controller, the one or more signals to generate one or more control commands. The method includes communicating, by the in-wall controller, the one or more control commands from the in-wall controller to a canopy controller associated with the ceiling fan via a first wireless communication link. The method includes implementing, by the canopy controller, one or more control actions based on the one or more control commands received from the in-wall controller via the first wireless communication link.

Yet another example aspect of the present disclosure is directed to an in-wall controller for a fan system. The in-wall controller can include an interface element configured to receive a user input to control operation of a ceiling fan. The in-wall controller can include a first communication interface configured to communicate one or more control commands determined in response to the user input to a canopy controller configured to control operation of the ceiling fan. The first communication interface can communicate the one or more control commands to the canopy controller via a first communication protocol. The in-wall controller can include a second communication interface configured to communicate data associated with operation of the ceiling fan. The second communication interface can communicate the data via a second communication protocol that is different than the first communication protocol.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
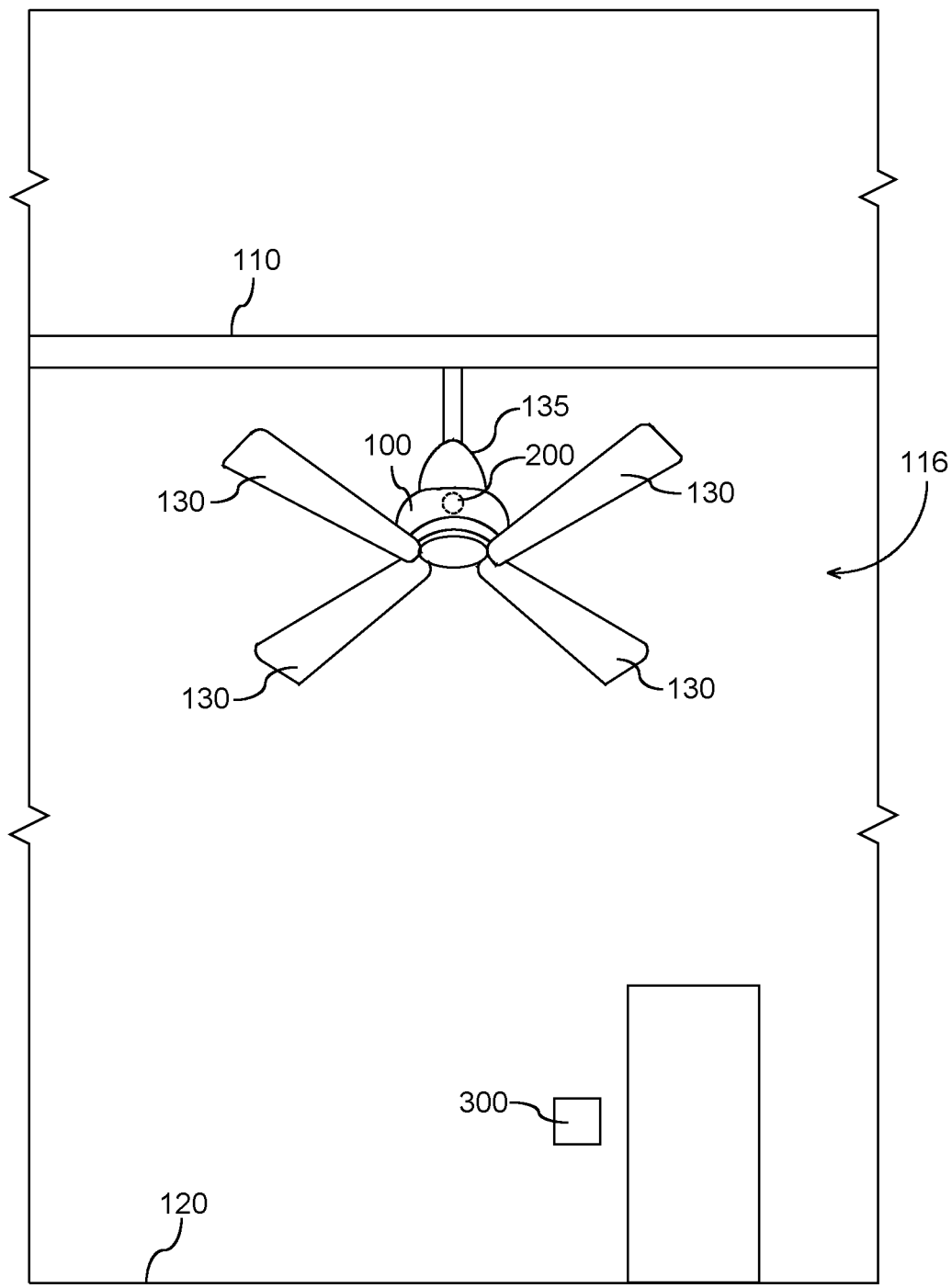
FIG. 1 depicts a ceiling fan suspended from a ceiling according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to fan systems for circulating air in a space. In some embodiments, the fan system can include a ceiling fan. The ceiling fan can be mounted to a ceiling or other surface. The ceiling fan can include a plurality of fan blades and a motor. Each fan blade can be rotatably coupled to the motor. In this way, the motor can drive rotation of the fan blades to circulate air within a space in which the ceiling fan is mounted. In some embodiments, the ceiling fan can include a light source configured to illuminate the room. In some embodiments, the ceiling fan can be a bladeless ceiling fan with no fan blades.

Embodiments of the present disclosure will be discussed with reference to a ceiling fan for purposes of illustration and discussion. Those of ordinary skill in the art, using the disclosures provided herein, will understand that aspects of the present disclosure are applicable in other fan systems.

According to example aspects of the present disclosure, the fan system can include a canopy controller associated with the ceiling fan. In addition, the fan system can include an in-wall controller. The canopy controller can be located within a canopy portion of the ceiling fan. The canopy controller can be configured to control operation of the ceiling fan, such as fan speed, fan rotation, lighting from one or more light sources, etc. In some embodiments, the canopy controller can control the ceiling fan based on control commands received over a communication link (e.g., a wireless communication link) from the in-wall controller.

The in-wall controller can be an in-wall device. An "in-wall device" is an electrical or electronic device that can be mounted on and/or in a wall or other surface, such as a panel, ceiling, floor, or other surface. In some embodiments, an in-wall device can be mounted in an electrical box that is secured on and/or in a wall or other surface.

The in-wall controller and/or the canopy controller can include one or more processors and one or more memory devices. The one or more processors can execute computer-readable instructions that, when executed by the one or more processors, cause the one or more processors to perform operations, such as any operations associated with functionality described herein. Example functionality can include communicating with other devices over one or more communication links. For instance, the canopy controller can communicate with the in-wall controller over a first communication link. The in-wall controller can communicate with other devices (e.g., user devices such as smartphones, tablets, wearable devices, etc., servers, the Internet, cloud computing devices, etc.) using one or more second communication links. The first communication link can be, for instance, a Bluetooth Low Energy communication link. The second communication link can be, for instance, an IEEE 802.11 (Wi-Fi) communication link.

Other communication technologies and/or protocols can be used without deviating from the scope of the present disclosure. Example communication technologies and/or protocols can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, ZigBee, HaLow, cellular communication, LTE, low-power wide area networking, VSAT, Ethernet, MoCA (Multimedia over Coax Alliance), PLC (Power-line communication), DLT (digital line transmission), etc. Other suitable communication technologies and/or protocols can be used without deviating from the scope of the present disclosure.

According to example embodiments of the present disclosure, the in-wall controller can include one or more interface elements (e.g., button interface elements). A user can interact with one or more of the interface elements to generate control commands at the in-wall controller for control of the ceiling fan. The control commands can be associated with fan speed, direction of rotation, lighting, etc.

In addition and/or in the alternative, a user can interface with the in-wall controller via a user device connected to the in-wall controller via a communication link (e.g., a network). For instance, a user can access an application implemented on a user device (e.g., a smartphone, tablet, laptop, wearable device, display with one or more processors, etc.). The application can present a graphical user interface or other user interface (e.g., audio interface) to a user. A user can interact with the graphical user interface to control settings and/or operation of the ceiling fan. Signals associated with the user interaction can be communicated to the in-wall controller for instance, over a network to control and/or adjust settings of the in-wall controller. In addition, and/or in the alternative, data associated with the ceiling fan (e.g., data from one or more sensors, power meters, etc.,) can be communicated to the user device for presentation to the user.

In addition and/or in the alternative, the in-wall controller can include one or more microphones configured to receive an audio input for audio control of the fan system. For instance, the in-wall controller can receive audio data and process the audio data (e.g., locally or at a remote device) to identify one or more voice commands (e.g., "turn on fan."). The in-wall controller can provide control commands to the canopy controller to operate the ceiling fan in accordance with the voice commands. In some embodiments, the in-wall controller can obtain audio data for use as part of a digital audio assistant service.

In some embodiments, the microphone(s) can be covered with a film. More specifically, the film can be comprised of a water-resistant material. In this manner, the film can prevent moisture from getting through to the microphone(s).

The in-wall controller can generate one or more control commands based on the user interaction with in-wall controller. The control commands can be communicated to the canopy controller over a communication link (e.g., a Bluetooth Low Energy communication link). The canopy controller can receive the control commands and control operation of the ceiling fan based on the received control commands. In some embodiments, the in-wall controller can communicate other information (e.g., software updates) to the canopy controller.

In some embodiments, the canopy controller can include a form factor configured to fit within a canopy of a ceiling fan. The canopy controller can provide for independent power output for control of a fan motor and provide for independent power output for control of one or more light sources on the ceiling fan.

In some embodiments, the canopy controller can control a fan motor using reactive fan control (e.g., controlling a capacitance coupled to a fan motor). The fan control can provide for multiple speeds of the fan motor (e.g., off, slow, medium, fast, etc.). The canopy controller can include a thryristor (e.g., TRIAC) to drive the fan motor.

In some embodiments, the canopy controller can include a light controller. The light controller can be configured to control one or more light sources associated with the ceiling fan. For instance, the light controller can dim, brighten, turn on, and turn off one or more light sources associated with the ceiling fan.

In some embodiments, the canopy controller can be configured to receive electrical power for powering the ceiling fan (e.g., fan motor and/or one or more light sources) via electrical conductors (e.g., a load conductor and a neutral conductor) from the in-wall controller. In this way, the in-wall controller can be hardwired to the canopy controller via the electrical conductors. In addition, the in-wall controller can communicate control commands to the canopy controllers over a wireless communication link.

In some embodiments, the in-wall controller receives power from a power source (e.g., breaker, panel, etc.) and provides output power to the canopy controller via electrical conductors. The in-wall controller can have power metering incorporated into the in-wall controller. Power metering can be implemented, for instance, by measuring voltage and/or currently flowing through a load wire passing through the power switch. Current can be measured, for instance, using a sense resistor. Voltage can be measured using, for instance, a voltage divider. Power flowing through the load wire can be computed (e.g., using one or more processors located on the power switch and/or remote from the power switch) based on the measured current and voltage. In some embodiments, the power meter can be included in the canopy controller.

The information from power metering can be used for a variety of purposes. For example, in some embodiments, data indicative of power consumption can be communicated to a user device (e.g., over a network) to provide feedback (e.g., real-time feedback) of power consumption by the ceiling fan. As another example, in some embodiments, the power switch and/or a device in communication with the in-wall controller can process data indicative of power consumption to detect when power delivered to the ceiling fan exceeds a power rating associated with the ceiling fan. The in-wall controller can be configured to automatically reduce power delivered to the ceiling fan to a safe level. In addition, an alert can be communicated to a user.

In some embodiments, the in-wall controller can include an airgap switch (e.g., a relay) that can be used to control power to the canopy controller. A user interaction with the in-wall controller (e.g., via a voice command, interface element, or user device) can trigger the airgap switch to remove power from the canopy controller, bringing it offline.

As used herein, an "alert" provided by the power switch can be an audio alert, visual alert, electronic data communication, display on a user interface associated with a device in communication with the in-wall controller, etc. For instance, a visual alert can be provided via one or more indicators (e.g., light ring, night light, etc.). A visual alert can also be provided by controlling one or more lighting devices associated with the ceiling fan. An alert can be provided by communicating data from the in-wall controller to another device over a communication link. For instance, data associated with an alert can be communicated to a user device. The user device can then provide an audio alert, visual alert (e.g., via a graphical user interface), haptic alert, etc.

In some embodiments, the in-wall controller can include one or more indicators configured to provide visual information to the user. For instance, a night light (e.g., a light bar) can be displayed at the in-wall controller. The night light can provide ambient lighting at night, allowing a user to easily locate the in-wall controller in the dark. The color and/or brightness of the night light can be specified as part of settings associated with the in-wall controller (e.g., via an application implemented on a user device).

In some embodiments, the in-wall controller can display a light ring indicator. The light ring indicator can provide information associated with one or more operating parameters (e.g., fan speed) of the ceiling fan. For instance, a quarter of the light ring indicator can be displayed when fan speed is reduced to about 25% of full speed (e.g., low speed). Half of the light ring indicator can be displayed when the fan speed is at about 50% of full speed (e.g., medium speed). Three quarters of the light ring indicator can be displayed when fan speed is at about 75% of full speed. Finally, the full light ring can be displayed when the fan is operating at full speed.

With reference now to the FIGS., FIG. 1 depicts an example ceiling fan 100 mounted to a ceiling 110. As shown, the ceiling 110 can be positioned above a floor 120 to define a space 116. The space 116 can be, for instance, a room (e.g., kitchen, living room, etc.) of a residential home. The ceiling fan 100 can be used to circulate air within the space 116.

In some implementations, the fan 100 can include a plurality of fan blades 130. Each of the fan blades 130 can be coupled to a blade hub (not illustrated). More specifically, the fan blades 130 can be coupled to the blade hub so that the fan blades 130 are spaced apart from one another along a circumferential direction. In some implementations, each fan blade 130 can be coupled to the blade hub via a blade arm (not illustrated). For instance, the blade arm can be coupled to one of the fan blades and the blade hub via any suitable mechanical fastener (e.g., screws). In some embodiments, the fan 100 can be a bladeless fan.

The fan 100 can include an electric fan motor (not illustrated). More specifically, the fan motor can be an alternating current (AC) motor or a direct current (DC) motor. In some implementations, the fan blades 130 can be rotatably coupled to the fan motor via the blade hub. Rotating the fan blades 130 with the motor can circulate air within the space 116. The fan blades 130 can be rotated by the motor in a clockwise direction or a counterclockwise direction.

In some implementations, the fan 100 can include a canopy housing 135 configured to accommodate the motor and other components used for operation of the fan 100. More specifically, the motor can be positioned within a cavity defined by the canopy housing 135. In addition, the canopy housing 135 can house other components for operation of the fan 100, such as a canopy controller 200. As discussed below in more detail, the canopy controller 200 can be used to implement various functionality of the fan 100 and other devices discussed herein.

In some embodiments, the fan 100 can include a light source (not illustrated) operable to illuminate the space 116. The light source can include any suitable source for emitting light, such as an incandescent light source, fluorescent light source, one or more light emitting diodes (LEDs), or other light source.

As will be discussed in more detail below, the canopy controller 200 located within the canopy housing 135 can control operation of the fan 100 based at least in part on control commands received from an in-wall controller 300. The in-wall controller 300 can deliver power to both the ceiling fan 100 and the canopy controller 200 via one or more electrical conductors (e.g., wires). In addition, the in-wall controller 300 can be in communication with the canopy controller 200 over a wireless communication link (e.g., Bluetooth Low Energy communication link).

Although the canopy controller 200 and the in-wall controller 300 are depicted as being in separate locations, in some implementations the canopy controller 200 and the in-wall controller can be located at the same location. For instance, in some implementations, both the canopy controller 200 and the in-wall controller 300 can both be positioned within the same electrical box. In alternative implementations, both the canopy controller 200 and the in-wall controller 300 can be disposed within the canopy housing 135 of the ceiling fan 100.

Figure 2:
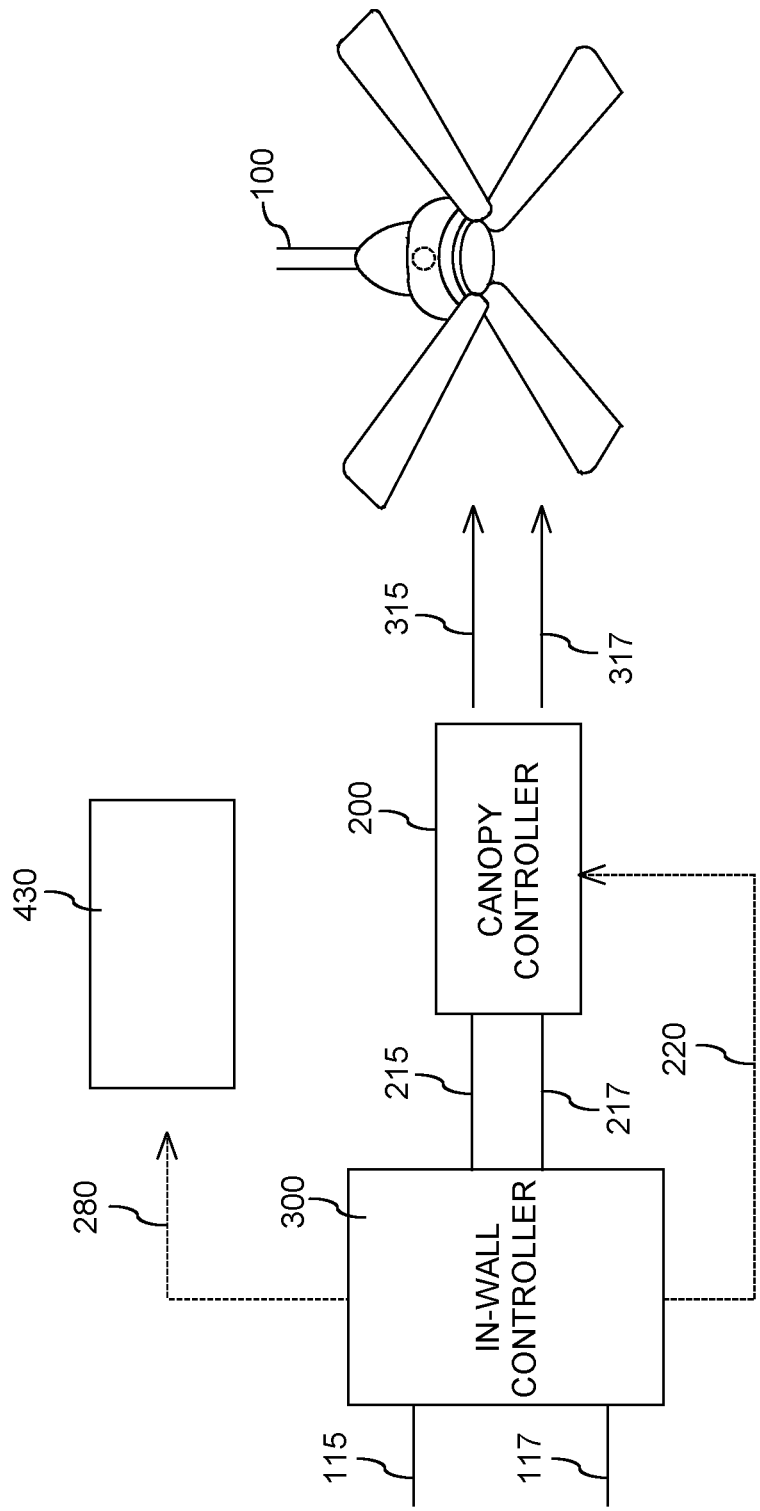
FIG. 2 depicts a bock diagram of an example fan system according to example embodiments of the present disclosure.

FIG. 2 depicts an overview of an example fan system according to example embodiments of the present disclosure. As shown, the fan system includes a fan 100, a canopy controller 200 and an in-wall controller 300. The in-wall controller 300 can receive power from a power source (e.g., breaker, panel, circuit, etc.) via conductors 115 and 117. Conductor 115 can be a load conductor. Conductor 117 can be a neutral conductor. The in-wall controller 300 can provide electrical power to the canopy controller 200 via electrical conductors 215 and 217. Conductor 215 can be a load conductor and conductor 217 can be a neutral conductor. The canopy controller 200 can provide independent fan motor power 315 to a fan motor and independent light source power 317 to one or more light sources associated with the ceiling fan 100.

The in-wall controller 300 can control operation of the ceiling fan 100 (e.g., via canopy controller 200) using control commands sent via a communication link 220. The communication link 220 can be a wireless communication link. The communication link 220 can be associated with a suitable wireless communication protocol, such as Bluetooth Low Energy wireless communication protocol or other suitable wireless communication protocol.

The in-wall controller 300 can be in communication with other device(s) 430, such as one or more computing devices, user devices, servers, cloud computing devices, etc. over a second communication link 280. The second communication link 280 can be a wireless communication link. The second communication link 280 can be associated with a wireless communication protocol, such as IEEE 802.11 wireless communication protocol or other suitable communication protocol. Details concerning example devices in communication with the in-wall controller 300 will be discussed with reference to FIG. 5.

Figure 3:
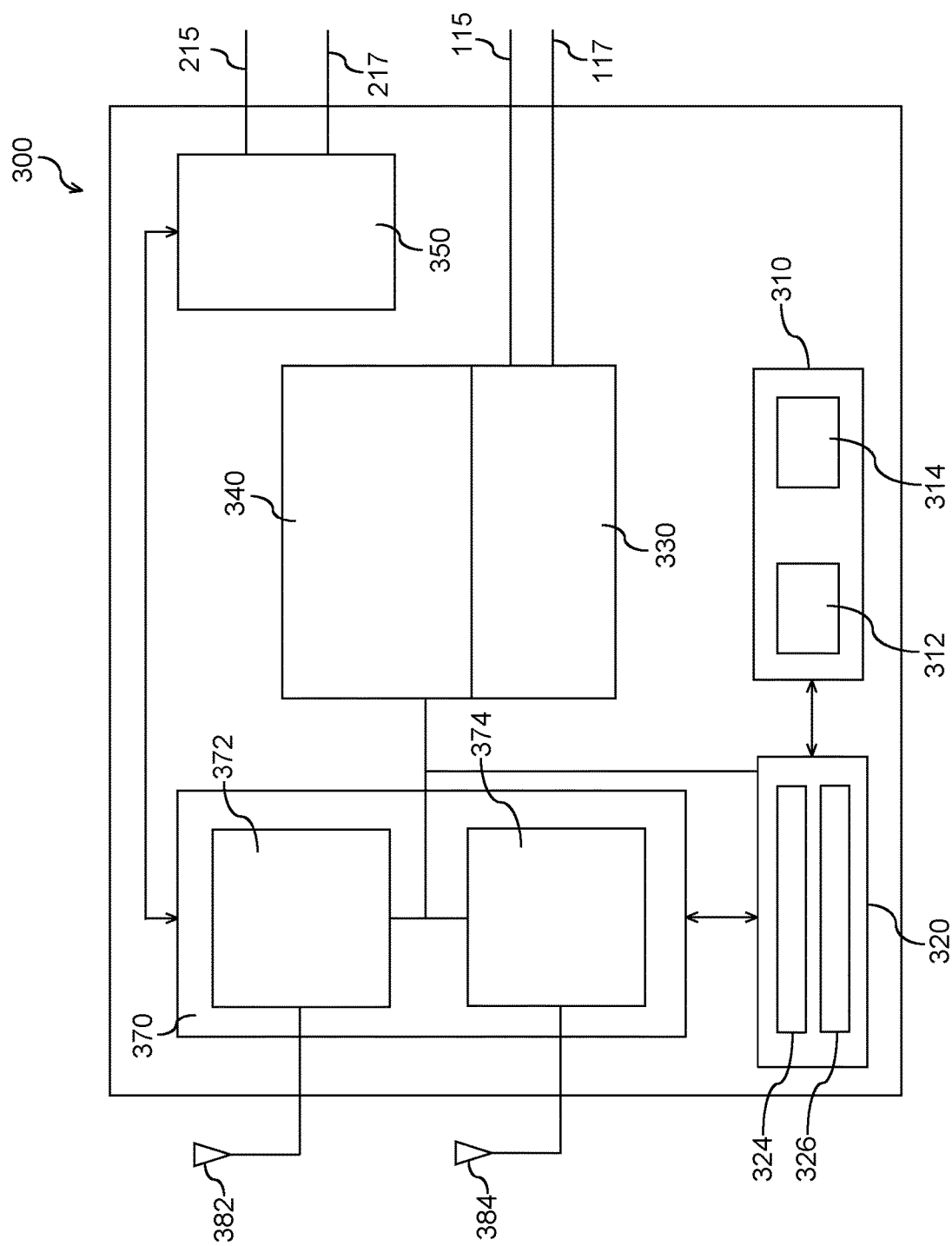
FIG. 3 depicts a block diagram of an example in-wall controller according to example embodiments of the present disclosure.

FIG. 3 depicts a block diagram of an example in-wall controller 300 according to example embodiments of the present disclosure. The in-wall controller 300 can include interface circuitry 310 configured to process and/or manage various input and output devices associated with the in-wall controller. For instance, the interface circuitry 310 can process inputs from a user provided via buttons or other interface elements 312 (e.g., touchpad, contactless gestures, rocker buttons, toggle switches, dimmer knobs, etc.) on the in-wall controller 300.

The interface circuitry 310 can also include one or more drivers or other circuits used to control the illumination of indicators (e.g., LED indicators) on the in-wall controller 300. For instance, the interface circuitry 310 can include an LED driver used to power LEDs 314 to provide visual indicators to a user. The visual indicators can be, for instance, a night light and/or light ring.

The in-wall controller 300 can include controller circuitry 320 that can be used to implement various functionality of the in-wall controller 300, such as any of the functionality described herein. For instance, the controller circuitry 320 can control the communication of data and/or control commands from the in-wall controller 300. The controller circuitry 320 can control the processing of inputs received via interface circuitry 310. The controller circuitry 320 can control the delivery of outputs (e.g., indicators) via the interface circuitry 310. In some embodiments, the interface circuitry 310 can form a part or be included as the controller circuitry 320.

The control circuitry 320 can include one or more processors 324 and one or more memory devices 326. The one or more processors 324 can be any suitable processing device, such as microprocessors, integrated circuits (e.g., application specific integrated circuits), field programmable gate arrays, etc. that perform operations to control components (e.g., any of the components described herein). The one or memory devices 326 can be any suitable media for storing computer-readable instructions and data. For instance, the one or more memory devices 326 can include random access memory such as dynamic random access memory (DRAM), static memory (SRAM) or other volatile memory. In addition, and/or in the alternative, the one or more memory devices can include non-volatile memory, such as ROM, PROM, EEPROM, flash memory, optical storage, magnetic storage, etc.

The one or more memory devices 326 can store computer-readable instructions that, when executed by the one or more processors 324, cause the one or more processors 324 to perform operations, such as any of the operations described herein. The instructions can be software written in any suitable programming language or can be implemented in hardware. The one or more memory devices 326 can also store data that can be obtained, received, accessed, written, manipulated, created, and/or stored.

The in-wall controller 300 can include a communication interface 370. Communication interface 370 can allow for the communication of data via, for instance, one or more wireless links using one or more antennas (e.g., antenna 382 and antenna 384). In some implementations, the communication interface 370 can include, for example, one or more of a communications controller, receiver, transceiver, transmitter, port, conductors, software, and/or hardware for communicating data.

In the example embodiment of FIG. 3, the communication interface 370 can include a first circuit 372 for communicating data and other information (e.g., control commands) using a first communication protocol via antenna 382. For instance, the first circuit 372 can be configured to communicate data and other information, for instance, to a canopy controller and/or other in-wall controller using Bluetooth Low Energy communication technology.

The communication interface 370 can include a second circuit 374 for communicating data and other information (e.g., control commands) using a second protocol via antenna 384. For instance, the second circuit 374 can be configured to communicate data and other information, for instance, to a router, gateway, or other device using IEEE 802.11 communication technology.

The in-wall controller 300 can receive power from electrical conductors 115 and 117. The in-wall controller 300 can include a power meter 330 configured to determine power flowing through the in-wall controller 300. The power meter 330 can measure voltage and/or current flowing through a load wire 115. Current can be measured, for instance, using a sense resistor. Voltage can be measured using, for instance, a voltage divider. Power flowing through the load wire can be computed (e.g., using one or more processors 324 located on the in-wall controller 300 and/or remote from the in-wall controller 300) based on the measured current and voltage. In some embodiments, the power meter 330 can be a STPM32 metering circuitry manufactured by STMicroelectronics.

The in-wall controller 300 can include an AC to DC converter 340. The AC to DC converter 340 can convert AC power from the electrical conductors 115 and 117 to a DC power suitable for powering various components in the in-wall controller 300, such as communication interface 370, control circuitry 320, interface circuitry 310, etc.

The in-wall controller 300 can include a relay 350 or other switching element (e.g., power transistor, contactor, thyristor, etc.) for controlling the delivery of AC power from the in-wall controller 300 to the canopy controller 200 via conductors 215 and 217. In some embodiments, the relay 350 can serve as an airgap switch to disconnect power from the canopy controller 200.

Figure 4:
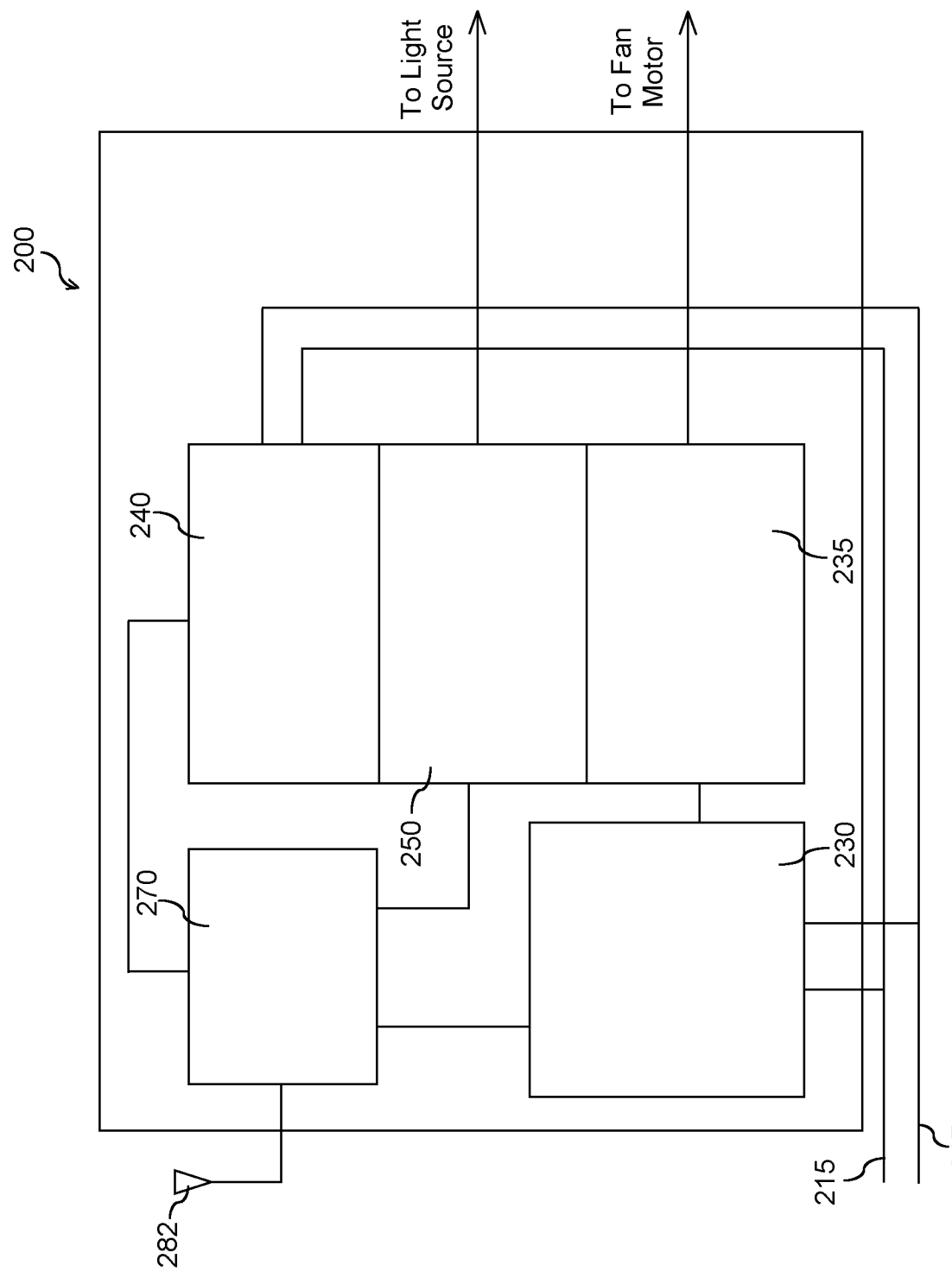
FIG. 4 depicts a block diagram of an example canopy controller according to example embodiments of the present disclosure.

FIG. 4 depicts a block diagram of an example canopy controller 200 according to example embodiments of the present disclosure. The canopy controller 200 can receive AC power from the in-wall controller 300 (FIG. 3) via conductors 215 and 217. The AC power can be provided to an AC to DC converter 240. The AC to DC converter 240 can convert AC power from the electrical conductors 215 and 217 a DC power suitable for powering various components in the canopy controller 200, such as communication interface 270, light controller 250, etc.

The AC power from conductors 215 and 217 can be provided to a reactive fan controller 230. The reactive fan controller 230 can be configured to control a fan motor to provide various functionality for a ceiling fan. For instance, the reactive fan controller 230 can control a direction of rotation of a fan motor and/or a fan speed of the fan motor. In some embodiments, the reactive fan controller 230 can control operating parameters of the fan motor by controlling a reactive component (e.g., a capacitor) coupled to the fan motor.

Aspects of the present disclosure are discussed with reference to an AC driven fan motor. Those of ordinary skill in the art, using the disclosures provided herein, will understand that the fan controller 230 can be operable to drive a DC fan motor. In these embodiments, the fan controller 230 can include a DC fan driver.

The canopy controller 200 includes a communication interface 270. Communication interface 270 can allow for the communication of data via, for instance, one or more wireless links using one or more antennas (e.g., antenna 282). In some implementations, the communication interface 270 can include, for example, one or more of a communications controller, receiver, transceiver, transmitter, port, conductors, software, and/or hardware for communicating data. The communication interface 270 can include components for communicating information and data (e.g., control commands) with an in-wall controller 300 (FIG. 3) over a wireless communication protocol, such as Bluetooth Low Energy.

In example embodiments, the canopy controller 200 can communicate data to the in-wall controller 300 (FIG. 3) based, at least in part, on a position of a switching device (e.g., dip that is located on or within the canopy housing 135 (FIG. 1). When the switching device is in a first position, the canopy controller 200 can provide data to the in-wall controller 300 (FIG. 3) that indicates one or more light sources 140 (FIG. 1) are present onboard the ceiling fan. When the switch is in the second position, the canopy controller 200 can provide data to the in-wall controller 300 that indicates one or more light sources are not present. In this manner, the canopy controller 200 can determine the position of the switch and provide data to the in-wall controller 300 that indicates whether one or more light sources are present onboard on the ceiling fan 100 (FIG. 1).

The canopy controller 200 can include a fan motor driver 235. The fan motor driver 235 can be controlled by the reactive fan controller 230 to power the fan motor according to control commands received from the in-wall controller 300 (FIG. 3) via communication interface 270. The fan motor driver 235 can include, for instance, a thyristor (e.g., TRIAC) and/or other components for driving a fan motor associated with the ceiling fan 100 (FIG. 1).

In some embodiments, the reactive fan controller 230 can be configured to operate the fan motor at one of four speeds, off, slow, medium, and fast. The canopy controller 200 can be configured to receive control commands via communication interface 270 from the in-wall controller 300 (FIG. 3) to operate the fan motor at one of the four speeds. The control commands can be processed at fan controller 230 to operate the fan motor at a speed specified by the one or more control commands.

The canopy controller 200 can include a light controller 250. The light controller 250 can be configured to power one or more light sources associated with the ceiling fan based at least in part on control commands received from the in-wall controller 300 (FIG. 3) via communication interface 270.

More particularly, in some embodiments, the light controller 250 can be configured to turn on or turn off the one or more light sources associated with the ceiling fan 100 (FIG. 1). The light controller 250 can further be configured to control a dimming level associated with the ceiling fan 100 (FIG. 1). The canopy controller 200 can be configured to receive control commands via communication interface 270 from the in-wall controller 300 to operate the one or more light sources (e.g., dim the light source(s), turn off the light source(s), turn on the light source(s), etc.). The control commands can be processed at light controller 250 to operate the one or more light sources.

In some embodiments, the fan controller 230 and/or the light controller 250 can include one or more processors and one or more memory devices. The one or more memory devices can store computer-readable instructions that, when executed by the one or more processors, cause the one or more processors to perform operations, such as any of the operations described herein.

Figure 5:
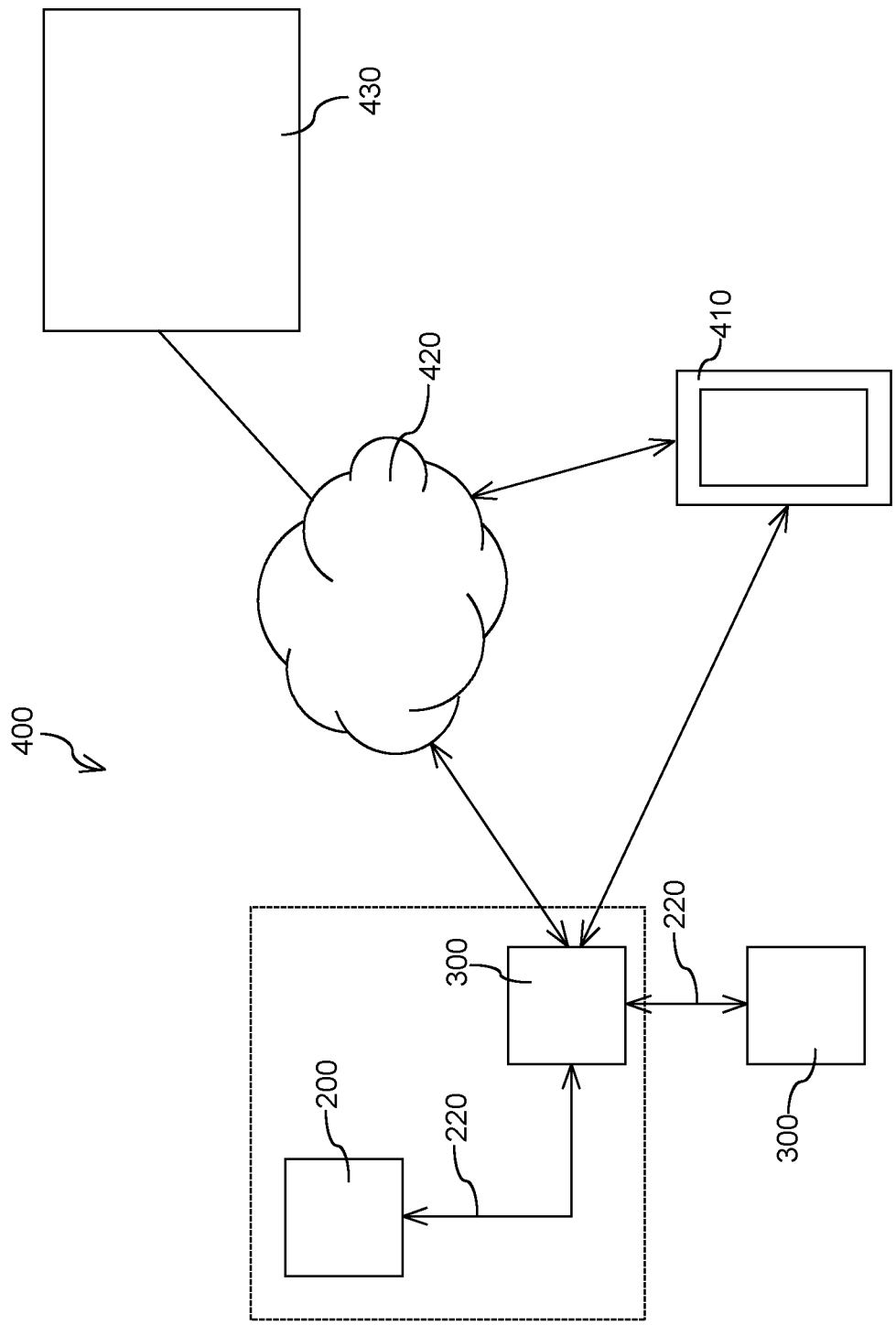
FIG. 5 depicts an example computing environment in which the fan system can be used according to example embodiments of the present disclosure.

FIG. 5 depicts an example computing environment 400 in which a fan system can be integrated according to example embodiments of the present disclosure. As previously discussed, an in-wall controller 300 can be in communication with a canopy controller 200 for a ceiling fan or other fan over a wireless communication link 220 (e.g., Bluetooth Low Energy communication link). In some embodiments, the communication link 220 can be established using a pairing operation. The pairing operation can be implemented prior to and/or after installation of the ceiling fan. As discussed above, the in-wall controller 300 can communicate control commands to the canopy controller 200 over communication link 220 to control operation of a ceiling fan.

In example embodiments, the pairing operation to enable communications between the canopy controller 200 and the in-wall controller 300 can be performed at a factory prior to being shipped to the consumer. In this manner, the consumer does not need to perform the pairing operation.

The in-wall controller 300 can be in communication with other in-wall controllers using communication link 220 (e.g., Bluetooth Low Energy or other suitable link) to provide 3-way, 4-way, or other multi-way switch functionality for the ceiling fan system. The relationship between multiple in-wall controllers can be master-slave, peer-to-peer, or other suitable relationship. In some embodiments, the communication link 220 can be established using a pairing operation. The pairing operation can be implemented prior to and/or after installation of the ceiling fan. As discussed above, the in-wall controller 300 can communicate control commands to the canopy controller 200 over communication link 220 to control operation of a ceiling fan.

The in-wall controller 300 can be in communication with other devices, such as user device(s) 410 and/or other remote device(s) 430 (e.g., server, cloud computing devices, etc.) over a network 420. For instance, the in-wall controller 300 can be in communication with user device(s) 410, via a direct communication link (e.g., direct wired or wireless communication link) or via a network, such as network 420. The direct communication link can be implemented, for instance, using Bluetooth Low Energy or other suitable communication protocol. The user device(s) 410 can be a smartphone, tablet, laptop, wearable device, desktop, display with one or more processors, or other suitable device. In some embodiments, a user can control, view information, and/or specify settings associated with the fan system via a graphical user interface implemented on a display of the user device 410. For instance, a user can access an application implemented on user device 410. The application can present a graphical user interface on a display of the user device 410. A user can interact with the graphical user interface to control operation of the fan system.

The network 420 can be any suitable type of network or combination of networks that allows for communication between devices. In some embodiments, the network(s) can include one or more of a secure network, Wi-Fi network, IoT network, mesh network, one or more peer-to-peer communication links, and/or some combination thereof, and can include any number of wired or wireless links. Communication over the network 420 can be accomplished, for instance, via a communication interface using any type of protocol, protection scheme, encoding, format, packaging, etc.

Remote computing systems 430 can be associated with a cloud computing platform for implementation of one or more services for the fan system. Data collected by the cloud computing platform can be processed and stored and provided, for instance, to a user device 410 (e.g., for presentation in a graphical user interface). The computing system 430 can include one or more computing devices (e.g., servers) having one or more processors and one or more memory devices. The computing system 430 can be distributed such that its components are located in different geographic areas.

The network 420 can include any combination of one or more wide and local area networks and can include any number of wired and/or wireless communication links. For instance, the network 420 can include one or more of a local area network, secure network, Wi-Fi network, IoT network, mesh network, one or more peer-to-peer communication links, wide area network, the Internet, cellular network and/or some combination thereof. Communication over the network 420 can be accomplished, for instance, via a communication interface using any type of protocol, protection scheme, encoding, format, packaging, etc.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

In example embodiments, a communication link between the in-wall controller 300 and the user device(s) 410 can be established using a pairing operation. For instance, the user device(s) 410 can be configured to capture one or more images depicting one or more machine-readable codes (e.g., Quick Response (QR) Code) located on or near the in-wall controller 300. In example embodiments, the one or more machine-readable codes can be included on a label (e.g., sticker) that is removably coupled to the in-wall controller 300. In this manner, the label can be removed from the in-wall controller 300 once the user device(s) 410 obtain the machine-readable code(s) and process the machine-readable code(s) to establish a communication link with the in-wall controller 300.

Figure 6:
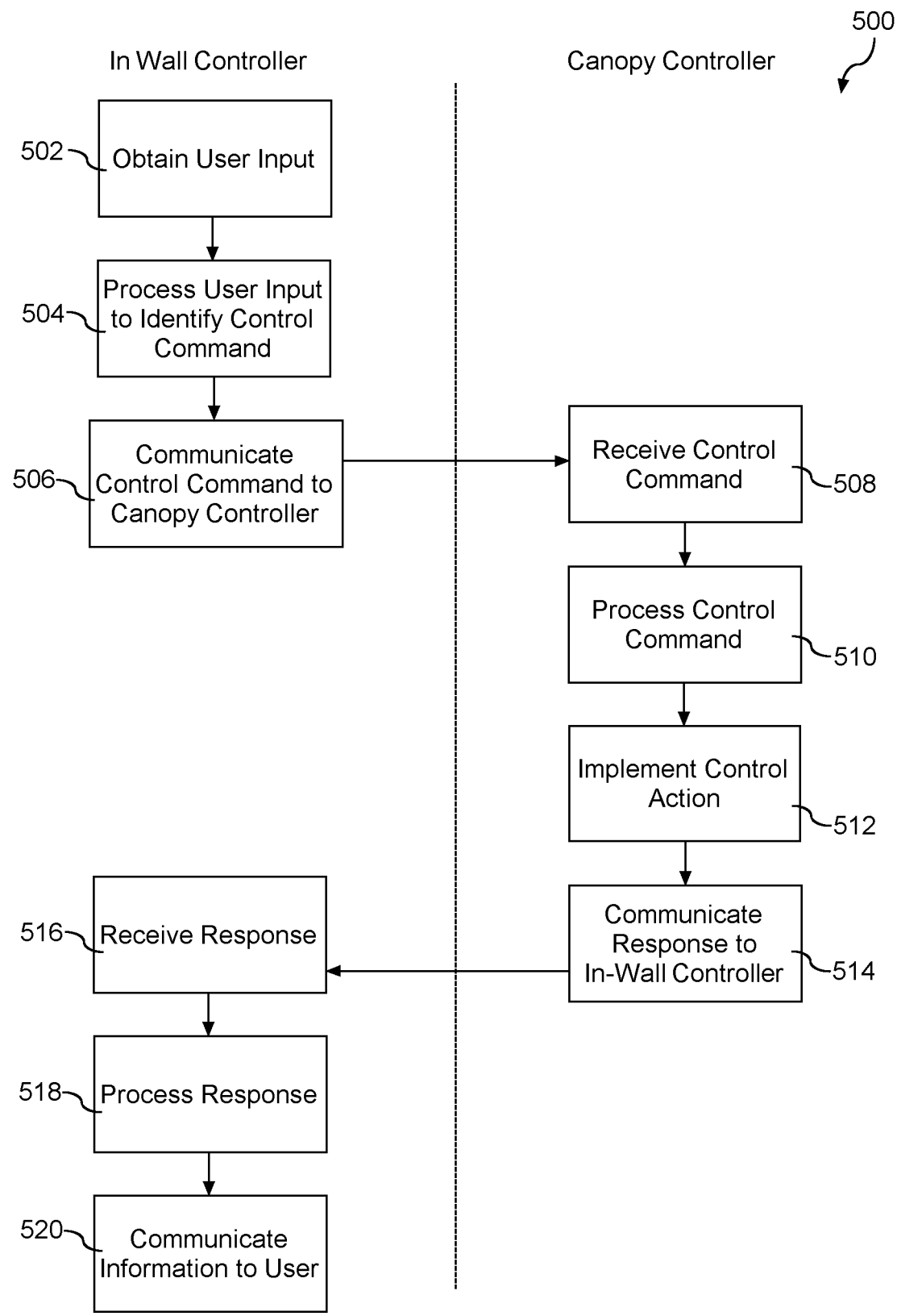
FIG. 6 depicts a flow diagram of an example method according to example embodiments of the present disclosure.

FIG. 6 depicts a flow diagram of an example method 500 of operation of a fan system according to example embodiments of the present disclosure. The method (500) can be implemented, for instance, using the fan system described with reference to FIGS. 1-4. FIG. 6 depicts steps performed in a particular order for purposes of illustration and discussion. Those of ordinary skill in the art, using the disclosures provided herein, will understand that various steps of any of the methods described herein can be adapted, expanded, omitted, rearranged, performed simultaneously, and/or modified in various ways without deviating from the scope of the present disclosure.

At (502), the method 500 can include obtaining data indicative of a user input at the in-wall controller. The data indicative of a user input can come from a variety of sources. For instance, the data indicative of user input can come from a user interacting with one or more interface elements (e.g., buttons, touchpad, etc.) at the in-wall controller. The data indicative of user input can come from a user device (e.g., via a communication interface). For instance, a user can interact with a graphical user interface implemented as part of an application executed on the user device to specify one or more settings and/or operations of the fan system. The data indicative of a user input can come from other sources without deviating from the scope of the present disclosure. For instance, in some implementations, the data indicative of user input can come from voice commands received from a user.

At (504), the method can include processing the user input to identify a control command for controlling operation of the fan system. The control command can be associated with fan speed, fan direction, and/or control of one or more light sources associated with the ceiling fan. In some embodiments, the control command can be determined using a look-up table, correlation function, or other similar data structure. As an example, a loop-up table can associate a first type of user input (e.g., the pressing of a certain button on the in-wall controller) with a first control command (e.g., turning on lights associated with ceiling fan). The look-up table can associate a second type of user input (e.g., a particular sequence of button pressing on the in-wall controller) with a second control command (e.g., pairing the in-wall controller with the canopy controller for communication over a wireless communication link), etc.

At (506), the method can include communicating the control command to the canopy controller. For instance, the control command can be communicated to the canopy controller over a wireless communication link.

Once the canopy controller receives the control command (508), the control command can be processed to determine an appropriate control action at (510). The control action can include, for instance, operating a fan motor to rotate clockwise or to rotate counterclockwise. The control action can include, for instance, operating a fan motor to rotate at a certain speed. The control action can include, for instance, stopping rotation of the fan motor. The control action can include turning on one or more light sources associated with the fan. The control action can include turning off one or more light sources associated with the fan. The control action can include controlling a dimming level or brightness of one or more light sources associated with the fan.

The method can include implementing the control action with the canopy controller at (512). For instance, a fan motor controller can be used to implement a control action associated with the fan motor. A light controller can be used to implement a control action associated with one or more light sources associated with the ceiling fan.

The method 500 can include communicating data associated with a response to the in-wall controller at (514). The data associated with the response can be, for instance, an acknowledgement that a control command was received and/or a confirmation that a control action has been implemented.

At (516), the in-wall controller can receive the data associated with the response. The data associated with the response can be processed by the in-wall controller at (518), for instance, to determine a responsive action to be implemented by the in-wall controller.

In some embodiments, the responsive action can include communicating information to a user (520). For instance, an alert or other notification can be provided to the user signifying the control action has been implemented at the canopy controller. As one example, an indicator (e.g., light ring indicator) can be controlled to display information to a user. As another example, data can be communicated to a user device for presentation in a graphical user interface. The data can be indicative of the operation of the ceiling fan (e.g., fan speed, direction of rotation, status of light sources, etc.)

Figure 7:
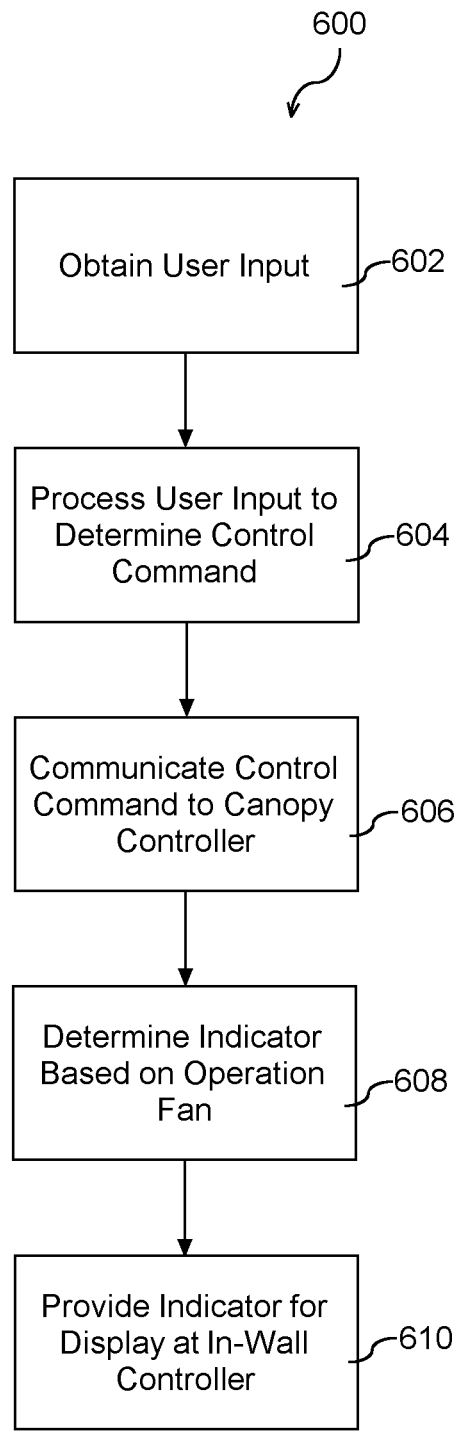
FIG. 7 depicts a flow diagram of an example method according to example embodiments of the present disclosure.
Figure 8A:
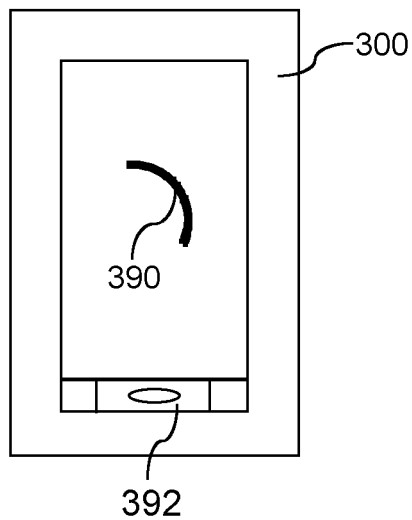
FIG. 8A depicts example indicators displayed on an in-wall controller indicative of operation of a fan system according to example embodiments of the present disclosure
Figure 8B:
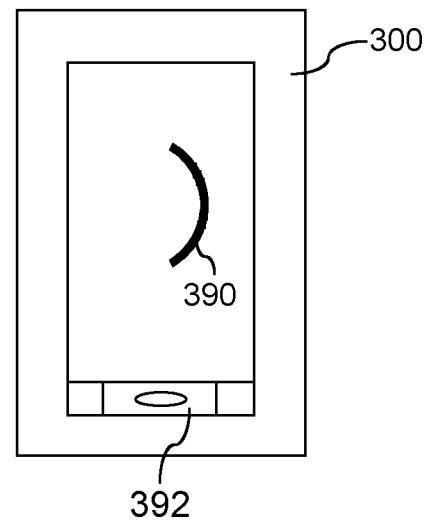
FIG. 8B depicts example indicators displayed on an in-wall controller indicative of operation of a fan system according to example embodiments of the present disclosure.
Figure 8C:
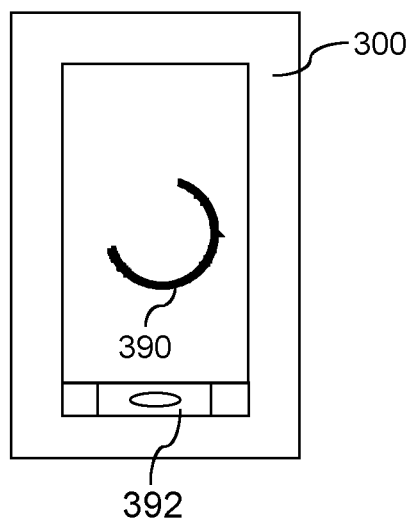
FIG. 8C depicts example indicators displayed on an in-wall controller indicative of operation of a fan system according to example embodiments of the present disclosure.
Figure 8D:
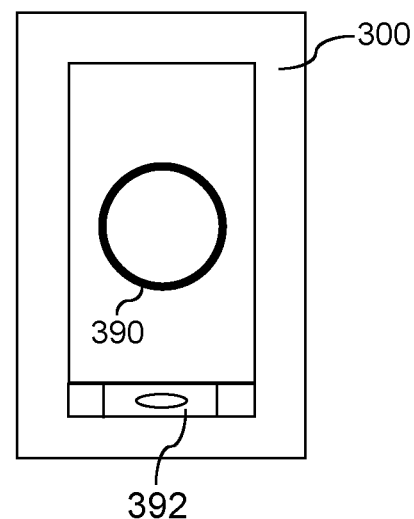
FIG. 8D depicts example indicators displayed on an in-wall controller indicative of operation of a fan system according to example embodiments of the present disclosure.

FIG. 7 depicts a flow diagram of an example method 600 for providing indicators for display at the in-wall controller indicative of a status of the ceiling fan according to example embodiments of the present disclosure. The method 600 can be implemented, for instance, using the fan system described with reference to FIGS. 1-4. FIG. 7 depicts steps performed in a particular order for purposes of illustration and discussion. Those of ordinary skill in the art, using the disclosures provided herein, will understand that various steps of any of the methods described herein can be adapted, expanded, omitted, rearranged, performed simultaneously, and/or modified in various ways without deviating from the scope of the present disclosure.

At (602), the method 600 can include obtaining data indicative of a user input at the in-wall controller. The data indicative of a user input can come from a variety of sources. For instance, the data indicative of user input can come from a user interacting with one or more interface elements (e.g., buttons, touchpad, etc.) at the in-wall controller. The data indicative of user input can come from a user device (e.g., via a communication interface). For instance, a user can interact with a graphical user interface implemented as part of an application executed on the user device to specify one or more settings and/or operations of the fan system. The data indicative of a user input can come from other sources without deviating from the scope of the present disclosure. For instance, in some implementations, the data indicative of user input can come from voice commands received from a user.

At (604), the method 600 can include processing the user input to identify a control command for controlling operation of the fan system. The control command can be associated with fan speed, fan direction, and/or control of one or more light sources associated with the ceiling fan. In some embodiments, the control command can be determined using a look-up table, correlation function, or other similar data structure.

At (606), the method 600 can include communicating the control command to the canopy controller for implementation of a control action by the canopy controller. For instance, the canopy controller can control fan speed, control fan direction, control one or more light sources associated with the fan, etc.

At (608), the method 600 can include determining an indicator for display to a user indicative of operating condition of the ceiling fan. The indicator can be determined, for instance, based on the control command send to the canopy controller and/or based on a response (e.g., acknowledgement or confirmation) from the canopy controller received at the in-wall controller.

At (610), the method 600 can include providing an indicator for display at the in-wall controller. For instance, the indicator can be a light ring indicator provided for display on a front of an in-wall controller. According to example embodiments of the present disclosure, the presentation of the light ring indicator can be tailored based on fan speed and/or lighting level. For instance, a sub-portion of the light ring indicator can be displayed depending on a fan speed at which the fan is controlled to operate.

FIGS. 8A, 8B, 8C and 8D depict the example display of indicators on an in-wall controller according to example embodiments of the present disclosure. In the example shown in FIG. 8A, the in-wall controller 300 can be configured to display a quarter portion (e.g., first subportion) of a light ring indicator 390 when the ceiling fan is operating at a first speed (e.g., low speed) or when light sources associated with the ceiling fan are dimmed to a first level. In the example shown in FIG. 8B, the in-wall controller 300 can be configured to display a half portion (e.g., a second subportion) of a light ring indicator 390 when the ceiling fan is operating at a second speed (e.g., medium speed) or when light sources associated with the ceiling fan are dimmed to a second level. In the example shown in FIG. 8C, the in-wall controller 300 can be configured to display a three-quarter portion of a light ring indicator 390 when the ceiling fan is operating at a third speed (e.g. high speed) or when light sources associated with the ceiling fan are dimmed to a third level. In the example shown in FIG. 8D, the in-wall controller 300 can be configured to display a full light ring indicator 390 when the ceiling fan is operating at full speed or when light sources associated with the ceiling fan are at full brightness.

Other suitable indicators indicative of operating parameters of the ceiling fan can be displayed without deviating from the scope of the present disclosure. For example, in some implementations, the in-wall controller can be configured to display one-third of a light ring indicator when the ceiling fan is operating at a first speed (e.g., low speed). The in-wall controller can be configured to display two-thirds of a light ring indicator when the ceiling fan is operating at a second speed (e.g., medium speed). The in-wall controller can be configured to display a full light ring indicator when the ceiling fan is operating at a third speed (e.g., full speed).

In some embodiments, the in-wall controller 300 can be configured to display different indicator depending on whether the user is controlling fan speed or the one or more light sources associated with the ceiling fan. For instance, the front of the in-wall controller 300 can include an interface element 392 (e.g., button, touch pad, touch screen, etc.) that allows a user toggle between control of fan speed and control of the one or more light sources. The in-wall controller 300 can display a light ring indicator 390 of a first color when controlling fan speed. The in-wall controller 300 can display a light ring indicator 390 of a second color when controlling dimming level of one or more light sources. It should be appreciated that the second color is different than the first color.

In some embodiments, a user can control dimming of one or more light sources based on interaction with the light ring indicator 390. For instance, a user can touch or place a finger, hand, or other stylus or device near the light ring indicator 390. The user can perform a tracing motion about or near the light ring indicator 390 in a first direction (e.g., clockwise) to increase a dimming level of one or more light sources associated with the ceiling fan. The user can perform a tracing motion about or near the light ring indicator 390 in a second direction (e.g., counterclockwise) to decrease dimming level of the one or more light sources associated with the ceiling fan.

In some implementations, a user can control fan speed of the ceiling fan based on interaction with the light ring indicator 390. For instance, a user can touch or place a finger, hand, or other stylus or device near the light ring indicator 390. The user can perform a tracing motion about or near the light ring indicator 390 in a first direction (e.g., clockwise) to increase a fan speed of the ceiling fan. The user can perform a tracing motion about or near the light ring indicator 390 in a second direction (e.g., counterclockwise) to decrease fan speed of the ceiling fan.

Figure 9:
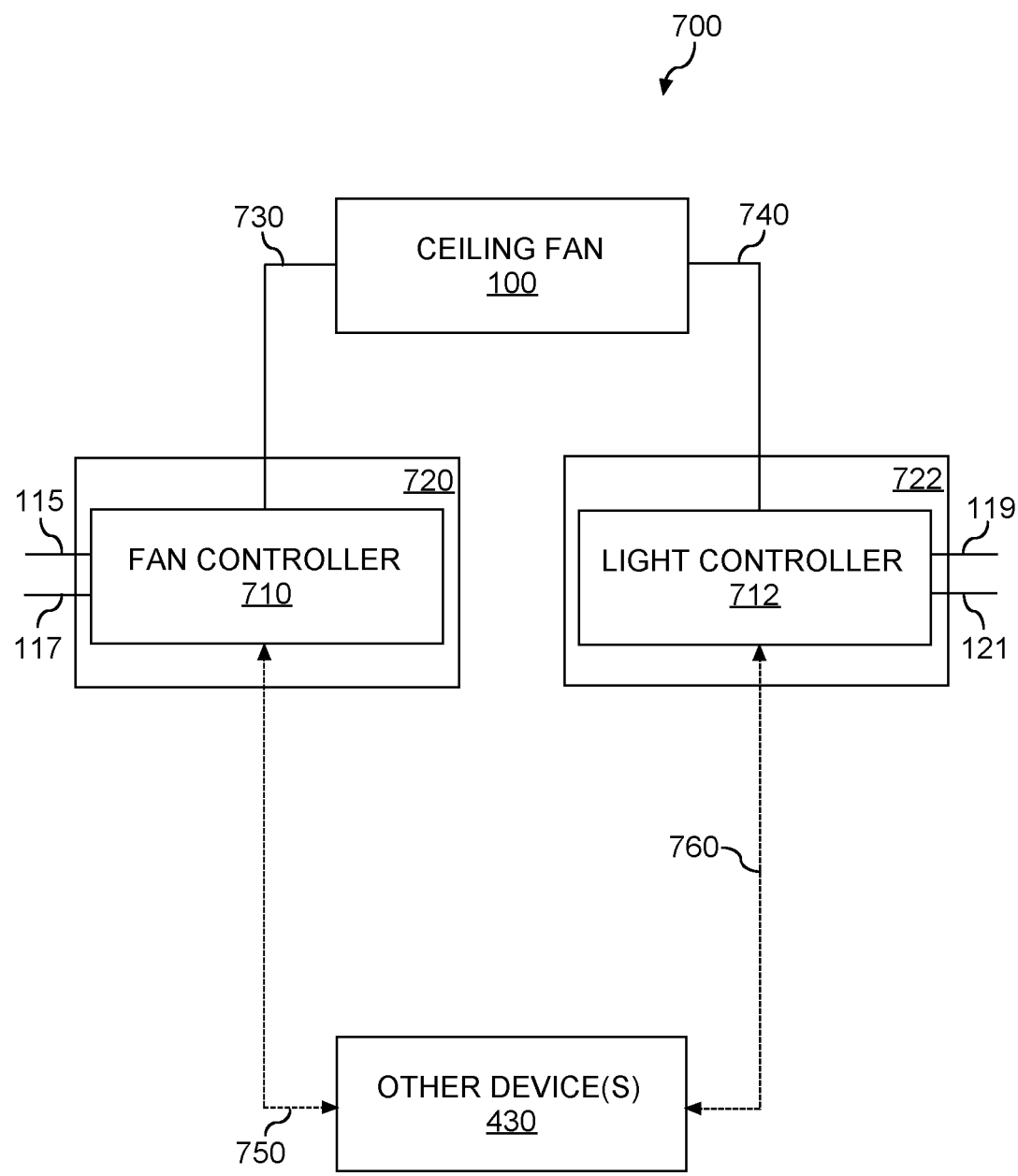
FIG. 9 depicts a block diagram of an example fan system according to example embodiments of the present disclosure.

Various modifications can be made to the fan system of the present disclosure. For instance, FIG. 9 depicts an example fan system 700 according to example embodiments of the present disclosure. The fan system 700 can include a ceiling fan, such as the ceiling fan 100 discussed above with reference to FIG. 1. As shown, the fan system 700 can include a fan controller 710. The fan controller 710 can be configured to control operation of a fan motor associated with the ceiling fan 100. More specifically, the fan controller 710 can control a direction of rotation of the fan motor and/or a fan speed of the fan motor. In example embodiments, the fan controller 710 can operate the fan motor at one of four speeds (e.g., off, slow, medium, fast).

The fan controller 710 can include various components for controlling operation of the fan motor. For instance, the fan controller 710 can include interface circuitry configured to process and/or manage various input devices associated with the fan controller 710. The interface circuitry can process inputs (e.g., control commands) received from a user via buttons or other interface elements (e.g., touchpad, contactless gestures, rocker buttons, toggle switches, dimmer knobs, etc.) on the fan controller 710.

The fan controller 710 can include control circuitry configured to process inputs received via the interface circuitry. As an example, the control circuitry can process data received from one or more input devices (e.g., microphones) of the fan controller 710. The control circuitry can include one or more processors and one or more memory devices. For example the control circuitry can include two (e.g., dual) processors or four (e.g., quad) processors. The processor(s) can be any suitable processing device, such as microprocessors, integrated circuits (e.g., application specific integrated circuits), field programmable gate arrays, etc. configured to perform operations to control operation of the fan motor. The one or more memory device can be any suitable media for storing computer-readable instructions and data.

The fan controller 710 can include one or more driver circuits for driving the fan motor of the ceiling fan. For instance, the driver circuit(s) can include, for instance, a thyristor (e.g., TRIAC) and/or other components for driving the fan motor. Alternatively or additionally, the fan controller 710 can include a LED board comprising a plurality of LEDs arranged in a ring to provide a light indicator ring, such as the light indicator ring 390 discussed above with reference to FIGS. 8A, 8B, 8C and 8D. In some embodiments, the LED board can include one or more LEDs positioned at a center of the LED ring. More specifically, the one or more LEDs positioned at the center of the LED ring can be configured to provide a night light indicator.

The fan controller 710 can include a communication interface that can allow for the communication of data via, for instance, one or more wireless links using one or more antennas. The communication interface can include, for example, one or more of a communications controller, receiver, transceiver, transmitter, port, conductors, software, and/or hardware for communication data.

Still referring to FIG. 9, the fan system 700 can include a light controller 712 configured to control one or more light sources associated with the ceiling fan 100. For instance, the light controller 712 can turn on or turn off the light source(s). Alternatively or additionally, the light controller 712 can dim or brighten the light source(s).

The light controller 712 can include various components for controlling operation of the one or more light sources associated with the ceiling fan 100. For instance, the light controller 712 can include interface circuitry configured to process and/or manage various input devices associated with the light controller 712. The interface circuitry can process inputs (e.g., control commands) received from a user via buttons or other interface elements (e.g., touchpad, contactless gestures, rocker buttons, toggle switches, dimmer knobs, etc.) on the light controller 712.

The light controller 712 can include control circuitry configured to process inputs received via the interface circuitry. As an example, the control circuitry can process data received from one or more input devices (e.g., microphones) of the light controller 712. The control circuitry can include one or more processors and one or more memory devices. For example the control circuitry can include two (e.g., dual) processors or four (e.g., quad) processors. The processor(s) can be any suitable processing device, such as microprocessors, integrated circuits (e.g., application specific integrated circuits), field programmable gate arrays, etc. configured to perform operations to control operation of the fan motor. The one or more memory device can be any suitable media for storing computer-readable instructions and data.

The light controller 712 can include one or more driver circuits for driving the light source(s) associated with the ceiling fan 100. Alternatively or additionally, the light controller 712 can include a LED board comprising plurality of LEDs arranged in a ring to provide a light indicator ring, such as the light indicator ring 390 discussed above with reference to FIGS. 8A, 8B, 8C and 8D. In some embodiments, the LED board can include one or more LEDs positioned at a center of the ring. More specifically, the one or more LEDs positioned at the center of the ring can be configured to provide a night light indicator.

The light controller 712 can include a communication interface that can allow for the communication of data via, for instance, one or more wireless links using one or more antennas. The communication interface can include, for example, one or more of a communications controller, receiver, transceiver, transmitter, port, conductors, software, and/or hardware for communication data.

In example embodiments, the fan controller 710 and the light controller 712 can be mounted in separate electrical boxes secured on and/or in a wall or other surface. More specifically, the fan controller 710 can be mounted in a first electrical box 720 (e.g., single gang box), whereas the light controller 712 can be mounted in a second electrical box 722 (e.g., single gang box). As shown, the fan controller 710 can receive electrical power via conductors 115, 117. The light controller 712 can receive electrical power via conductors 119, 121. Conductor 119 can be a load conductor and conductor 121 can be a neutral connector.

In example embodiments, the fan controller 710 can be hardwired to the ceiling fan 100 via one or more electrical conductors 730. For instance, the fan controller 710 can be hardwired to a fan motor associated with the ceiling fan 100. In example embodiments, the fan controller 710 can control operation of the fan motor via the conductor(s) 730. More specifically, the fan controller 710 can adjust (e.g., increase or decrease) an amount of power provided to the fan motor according to one or more user inputs received at the fan controller 710.

In example embodiments, the light controller 712 can be hardwired to the ceiling fan 100 via one or more electrical conductors 740. For instance, the light controller 712 can be hardwired to the light source(s) associated with the ceiling fan 100. In this manner, the light controller 712 can control the light source(s) via the conductor(s) 740. More specifically, the light controller 712 can adjust (e.g., increase or decrease) the lumen output of the light source(s) according to one or more user inputs received at the light controller 712.

In example embodiments, the fan controller 710 can communicate with other device(s) 430, such as one or more computing devices, user devices, servers, cloud computing devices, etc. over a communication link 750. Alternatively or additionally, the light controller 712 can communicate with the other device(s) 430 over a communication link 760. The communication links 750, 760 can be wireless communication links. For instance, the communication links 750, 760 can each be associated with a wireless communication protocol. Examples of the wireless communication protocol can include, without limitation, the Bluetooth Low Energy (BLE) wireless communication protocol and the IEEE 802.11 wireless communication protocol.

Figure 10:
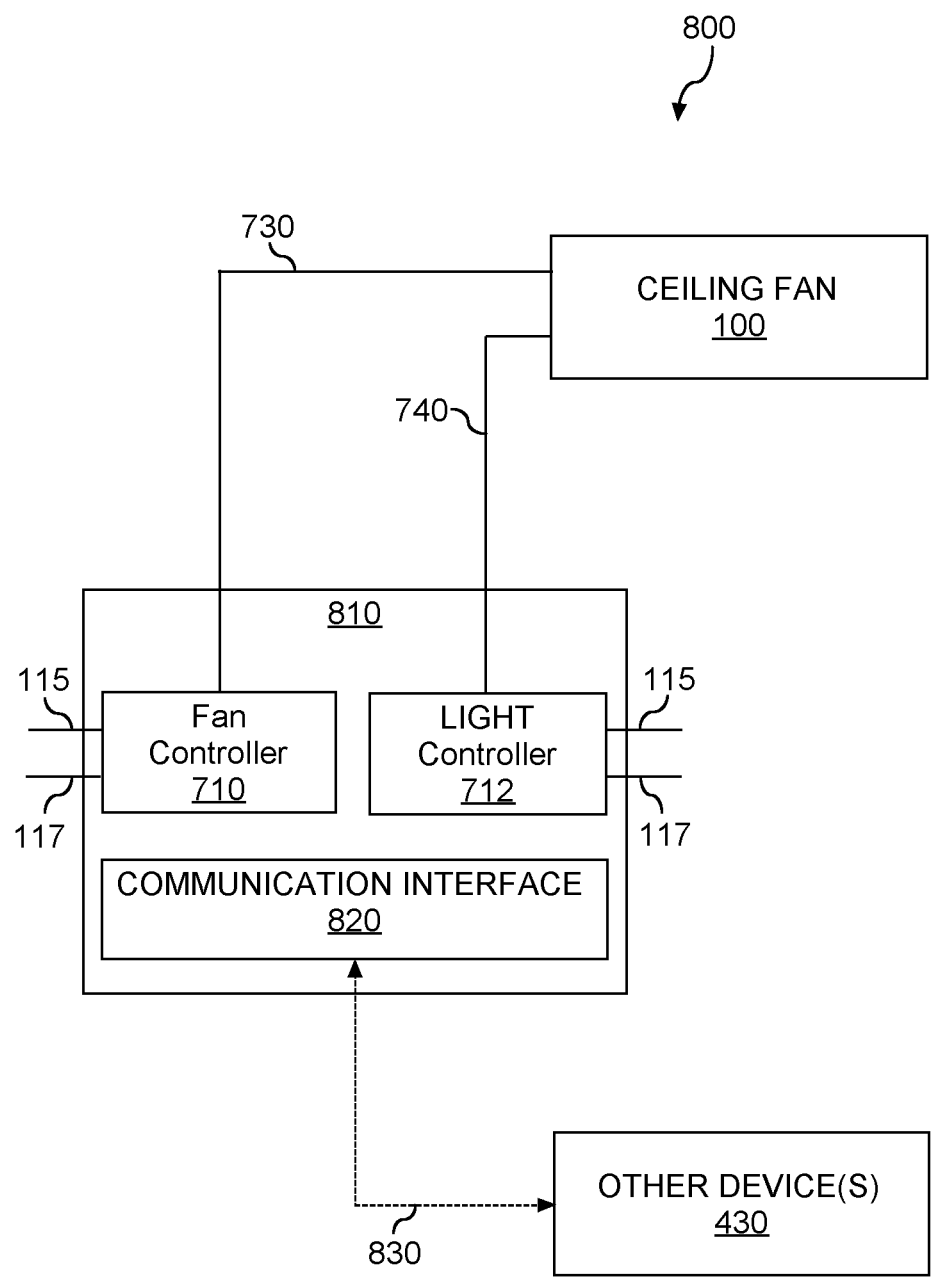
FIG. 10 depicts a block diagram of an example fan system according to example embodiments of the present disclosure.

Referring now to FIG. 10, another example fan system 800 is provided according to example embodiments of the present disclosure. As shown, several components of the fan system 800 are similar to components of the fan system 700 discussed above with reference to FIG. 9. For instance, the fan system 800 can include the fan controller 710 and the light controller 712. However, the fan system 800 may be different than the fan system 700 of FIG. 9. For instance, the fan system 800 of FIG. 10 includes an electrical box 810 (e.g., double gang electrical box) secured on and/or within a wall or surface and configured to accommodate both the fan controller 710 and the light controller 712. Additionally, the fan system 800 can include a communication interface 820 configured to provide communication between the other device(s) 430 and the controllers 710, 712 over a wireless communication link 830. In this manner, the fan system 800 of FIG. 10 does not require a separate communication interface for the fan and light controllers 710, 712.

Figure 11:
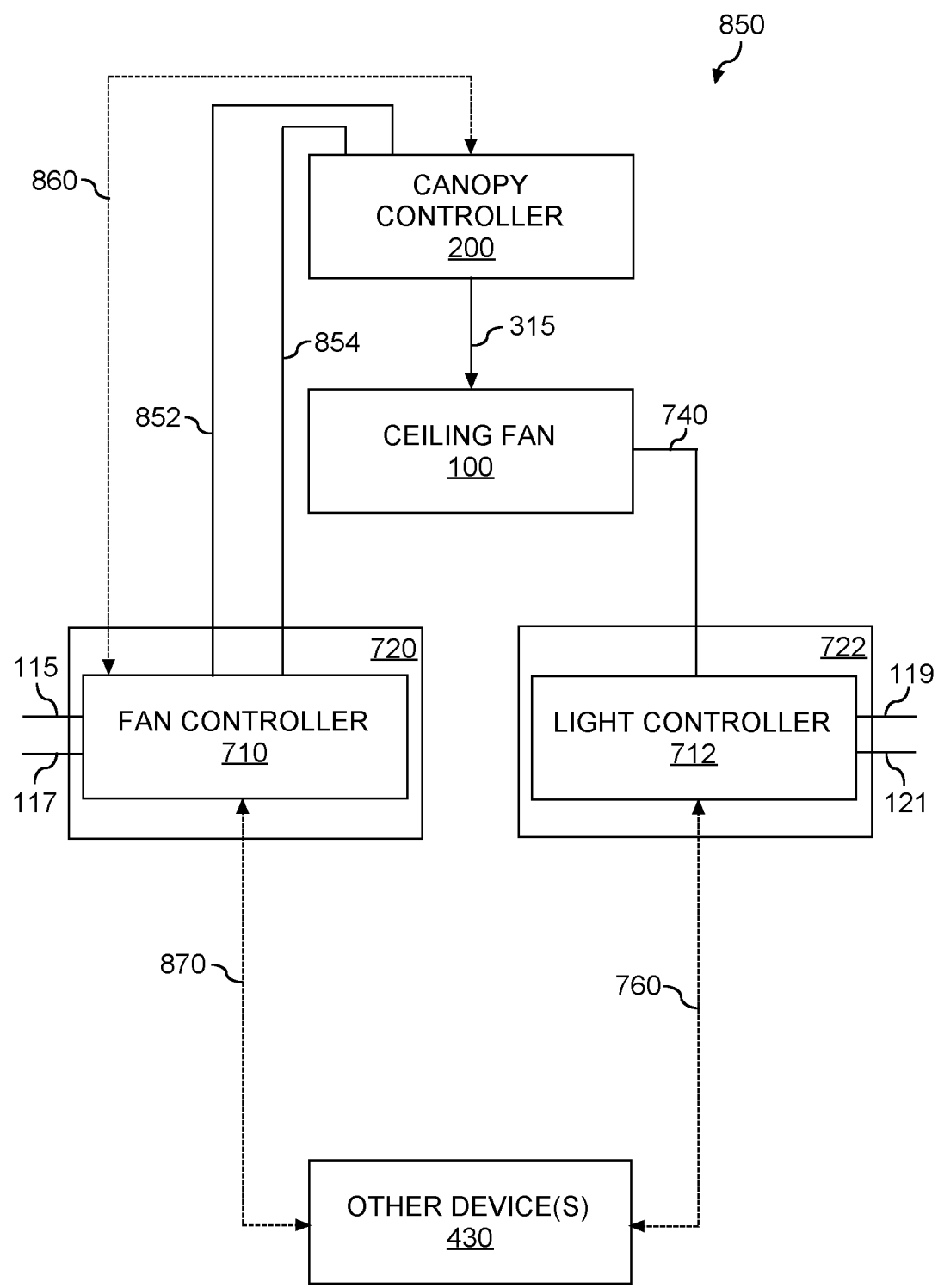
FIG. 11 depicts a block diagram of an example fan system according to example embodiments of the present disclosure.

Referring now to FIG. 11, another example fan system 850 is provided according to example embodiments of the present disclosure. As shown, several components of the fan system 850 are similar to components of the fan systems 700 discussed above with reference to FIG. 9. For instance, the fan system 850 includes the fan controller 710 and the light controller 712. However, the fan system 850 of FIG. 11 is different than the fan system 700 of FIG. 9. For instance, the fan system 850 of FIG. 11 includes a canopy controller, such as the canopy controller 200 discussed above with reference to FIG. 4. As will be discussed below in more detail, the canopy controller 200 can provide one or more commands 315 to control operation of a fan motor associated with the ceiling fan 100.

As shown, the fan controller 710 can provide electrical power to the canopy controller 200 via conductors 852, 854. In example embodiments, conductor 852 can be a load conductor. Alternatively or additionally, conductor 854 can be a neutral conductor. The fan controller 710 can provide one or more control commands to the canopy controller 200 over a first communication link 860. The canopy controller 200 can be configured to provide the one or more commands 315 to the fan motor (not shown) based on the one or more control commands received from the fan controller 210. For instance, the one or more commands 315 provided to the fan motor can be associated with adjusting (e.g., increasing or decreasing) a fan motor power (e.g., voltage or current) of the fan motor. In this manner, operation of the fan motor of the ceiling fan 100 can be controlled based on user input received at the fan controller 710. For example, a speed of the fan motor can be adjusted based, at least in part, on the one or more commands 315. Alternatively or additionally, a direction of rotation of the fan motor can be adjusted based, at least in part, on the one or more commands 315. It should be appreciated, however, that the one or more commands 315 can control any suitable aspect of operation of the fan motor.

In example embodiments, the first communication link 860 can be a wireless communication link. For instance, the first communication link 860 can be associated with a suitable wireless protocol, such as the Bluetooth Low Energy wireless communication protocol.

The fan controller 710 of FIG. 11 can be configured to communicate with the other device(s) 430 over a second communication link 870. In example embodiments, the second communication link 870 can be different than the first communication link 860. More specifically, the second communication link 870 can be a wireless communication link associated with a wireless communication protocol, such as the IEEE 802. 11 wireless communication protocol.

Figure 12:
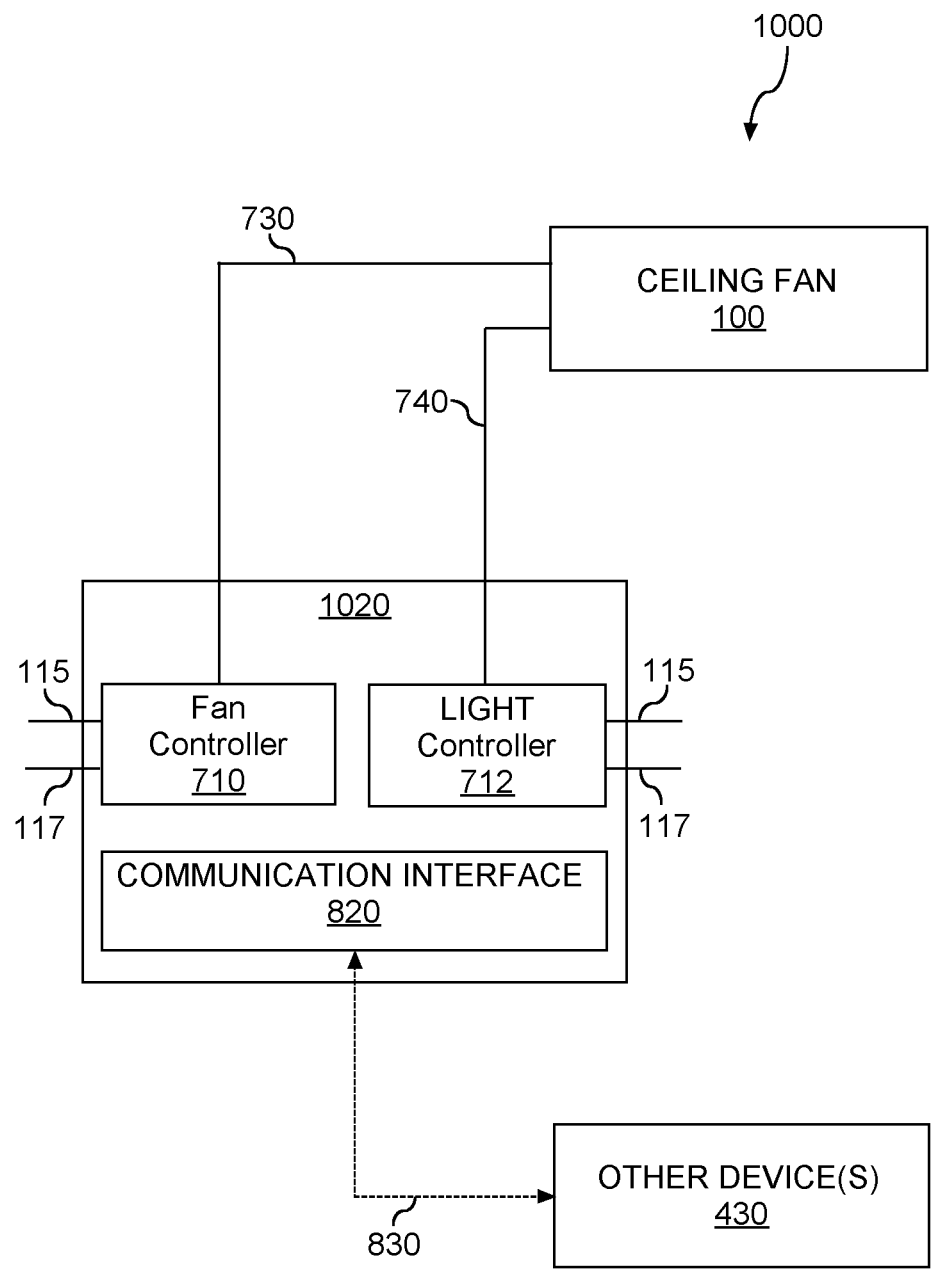
FIG. 12 depicts a block diagram of an example fan system according to example embodiments of the present disclosure.

Referring now to FIG. 12, another example fan system 1000 is provided according to example embodiments of the present disclosure. As shown, several components of the fan system 1000 are similar to components of the fan system 800 discussed above with reference to FIG. 10. For instance, the fan system 1000 can include the fan controller 710 and the light controller 712. However, the fan system 1000 of FIG. 12 may be different than the fan system 800 of FIG. 10. For instance, the fan system 1000 of FIG. 12 may include an electrical box 1020 that is different than the electrical box 810 of FIG. 10. More specifically, the electrical box 1020 can be a single gang electrical box secured on and/or within a wall or surface and configured to accommodate the fan controller 710, the light controller 712, and the communication interface 820.

In example embodiments, the pairing sequence for enabling communications between the controller 300, 710, 712 and a user device (e.g., other device 430) can be initiated when a user causes the user device to physically contact the controller 300, 710, 712. More specifically, the user can initiate the pairing sequence by knocking the user device against the controller 300, 710, 712 a predetermined number of times, such as three times. In this manner, instances in which the user device and the controller 300, 710, 712 are inadvertently paired with one another can be reduced or eliminated.

In example embodiments, the controller 300, 710, 712 and the user device can include an accelerometer configured to detect a user knocking the user device against the controller 300, 710, 712 to initiate the pairing sequence. More specifically, the one or more processors of the controller 300, 710, 712 can be configured to process data received from the accelerometer of the controller 300, 710, 712. Alternatively or additionally, one or more processors of the user device can be configured to process data received from the accelerometer of the user device. In this manner, the physical contact (e.g., knocking) required to initiate the pairing sequence can be detected by the controller 300, 710, 712, the user device, or both the controller 300, 710, 712 and the user device.

In example embodiments, one or more microphones of the controller 300, 710, 712 can detect audible noise associated with knocking the user device against the controller 300, 710, 712. More specifically, the one or more microphones can provide one or more data signals indicative of the audible noise associated with knocking the user device against the controller 300, 710, 712. The one or more processors of the controller 300, 710, 712 can be configured to process the data signal(s) to detect the user knocking the user device against the controller 300, 710, 712. It should be appreciated that the one or more processors of the controller 300, 710, 712 can process the data signal(s) to recognize the audible noise associated with the user knocking the user device against the controller 300, 710, 712.

Figure 13:
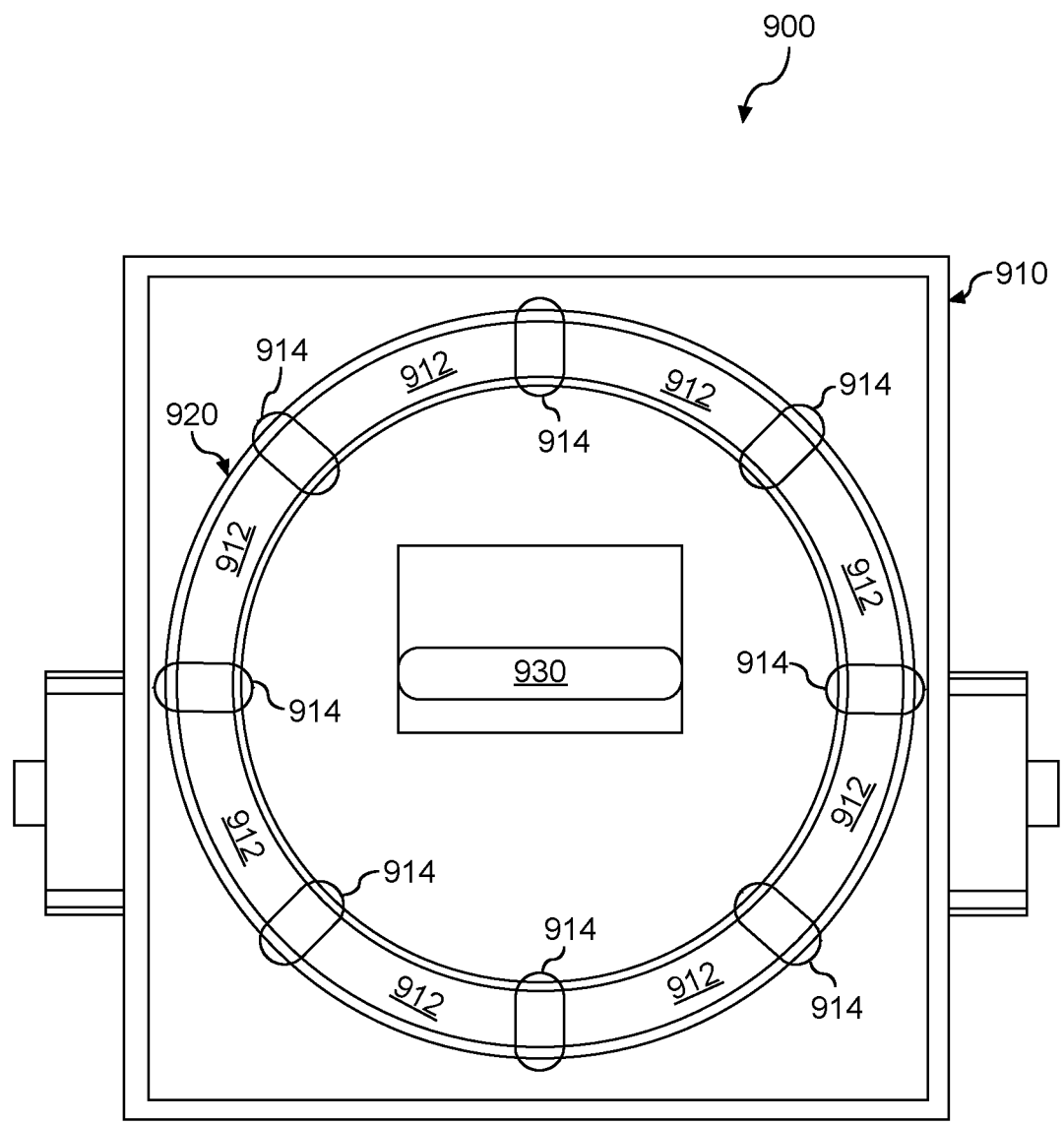
FIG. 13 depicts a front view of an example light blocker according to example embodiments of the present disclosure.
Figure 14:
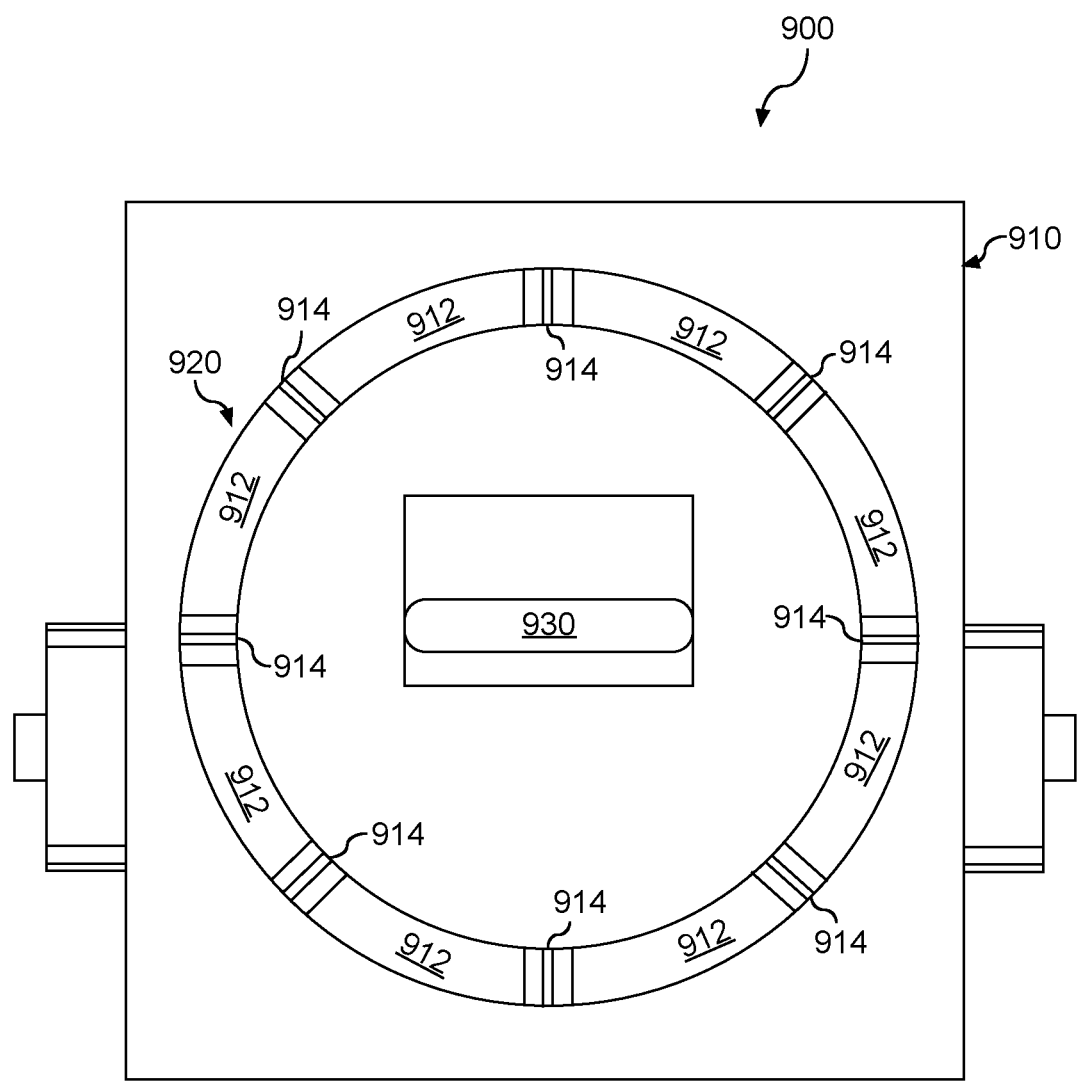
FIG. 14 depicts a rear view of an example light blocker according to example embodiments of the present disclosure.

Referring now to FIGS. 13 and 14, an example embodiment of a light blocker 900 is provided according to example embodiments of the present disclosure. In some embodiments, the light blocker 900 can be positioned over the LED ring of the controller 300, 710, 712. When the light blocker 900 is positioned over the LED ring, the light blocker 900 can, as will be discussed below in more detail, improve the visual appearance of the light indicator ring 390 (FIGS. 8A-D) provided by the LED ring.

As shown, the light blocker 900 includes body 910. The body 910 can include a first plurality of segments 912 and a second plurality of segments 914. In some embodiments, a light transmissivity of the first plurality of segments 912 can be different than a light transmissivity of the second plurality of segments 914. For example, the light transmissivity of the first plurality of segments 912 can be greater than the light transmissivity of the second plurality of segments 914. In this manner, more light can pass through the first plurality of segments 912 compared to the second plurality of segments 914.

In some embodiments, the first plurality of segments 912 and the second plurality of segments 914 are arranged in an alternating manner such that each segment of the first plurality of segments 912 is positioned between two adjacent segments of the second plurality of segments 914. As an example, the first plurality of segments 912 and the second plurality of segments 914 can be arranged in the alternating manner to form a ring 920. The light blocker 900 can be positioned over the LED board of the controller 300, 710, 712 such that the ring 920 of the body 910 is aligned with the LED ring. More specifically, the light blocker 900 can be positioned over the LED board such that each segment of the second plurality of segments 914 is aligned with one LED of the LED ring. Since the light transmissivity of the second plurality of segments 914 is less than the light transmissivity of the first plurality of segments 912, the light blocker 900 can reduce or eliminate hotspots in the light indicator ring 390. In this manner, the light blocker 900 can improve the visual appearance of the light indicator ring 390.

In some embodiments, the body 910 of the light blocker 900 can include a section 930 positioned at a center of the ring 920. In this manner, the section 930 can be aligned with the LED(s) positioned at the center of the LED board. In some embodiments, a light transmissivity of the section 930 can be different than the light transmissivity of the second plurality of segments 914. For example, the light transmissivity of the section 930 can be greater than the light transmissivity of the second plurality of segments 914. Accordingly, more light can pass through the section 930 compared to the second plurality of segments 914.

In some embodiments, the first plurality of segments 912 can be one or more apertures defined by the body 910 of the light blocker 900. Alternatively or additionally, the section 930 can be an aperture defined by the body 910 of the light blocker 900.

It should be appreciated that the controller 300, 710, 712 of the present disclosure can be implemented in any suitable environment. For instance, the in-wall devices can be implemented in one or more rooms of a hotel. In this manner, a guest can control one or more features of a room via the controller 300, 710, 712. For example, the guest can control operation of a television via one or more voice commands received at the controller 300, 710, 712. As another example, the guest can control operation of one or more light fixtures in the room.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A fan system comprising:
    a ceiling fan mountable to a surface, the ceiling fan having a canopy housing;
    a canopy controller disposed within the canopy housing, the canopy controller configured to control operation of a motor associated with the ceiling fan, the canopy controller having a communication interface configured to communicate using a first wireless communication protocol;
    an in-wall controller hardwired to the canopy controller via one or more electrical conductors, the in-wall controller configured to communicate one or more control commands to the canopy controller using the electrical conductors or the first wireless communication protocol, the in-wall controller further configured to illuminate a light indicator indicative of the implementation of the control actions by the fan system and also configured to communicate data associated with the ceiling fan via a second wireless communication protocol.

2. The fan system of claim 1, wherein the in-wall controller includes:
    a first communication interface configured to communicate using the first wireless communication protocol; and
    a second communication interface configured to communicate using the second wireless communication protocol.

3. The fan system of claim 2, wherein:
    the first wireless communication protocol is a Bluetooth Low Energy communication protocol; and
    the second wireless communication protocol is an IEEE 802.11 communication protocol.

4. The fan system of claim 1, wherein the in-wall controller includes an interface element configured to receive a user input associated with controlling operation of the ceiling fan.

5. The fan system of claim 1, wherein the canopy controller includes a reactive fan controller configured to control operation of a fan motor associated with the ceiling fan.

6. The fan system of claim 5, wherein the canopy controller further comprises a light controller configured to control operation of one or more light sources associated with the ceiling fan.

7. The fan system of claim 1, wherein the light indicator includes a light ring.

8. The fan system of claim 1, wherein the light indicator further includes a night light disposed at a center of the light ring.

9. The fan system of claim 8, wherein the in-wall controller is configured to illuminate a portion of the light ring based at least in part on a fan speed associated with the ceiling fan.

10. A method for operating a fan system, comprising:
    obtaining, at an in-wall controller of the fan system, one or more signals indicative of a user input;
    processing, at the in-wall controller, the one or more signals to generate one or more control commands;
    communicating, by the in-wall controller, the one or more control commands from the in-wall controller to a canopy controller associated with a ceiling fan using a first wireless communication link;
    implementing, by the canopy controller, one or more control actions based on the one or more control commands received from the in-wall controller;
    receiving, by the in-wall controller, data from the canopy controller indicative of the implementation of the control actions by the fan system; and,
    displaying, by the in-wall controller, one or more indicators indicative of the implementation of the control actions by the fan system.

11. The method of claim 10, wherein the one or more control actions comprise controlling operation of a fan motor associated with the ceiling fan.

12. The method of claim 11, wherein the one or more control actions comprise controlling a speed of a fan motor.

13. The method of claim 10, wherein the one or more control actions comprise controlling operation of a light source associated with the fan system.

14. The method of claim 10, wherein displaying one or more indicators comprises:
    illuminating, by the in-wall controller, a portion of a light ring based, at least in part, on operation of the fan system.

15. The method of claim 14, wherein illuminating a portion of the light ring comprises:
    illuminating, by the in-wall controller, a first portion of the light ring when the ceiling fan operates at a first speed; and
    illuminating, by the in-wall controller, a second portion of the light ring when the ceiling fan operates a second speed that is greater than the first speed.

16. An in-wall controller for a fan system, the in-wall controller comprising:
    an interface element configured to receive a user input associated with controlling operation of a ceiling fan;
    an electrical conductor connecting the in-wall controller to a canopy controller of the ceiling fan, the electrical conductor facilitating communication of control commands from the in-wall controller to the canopy controller;
    a first communication interface configured to communicate one or more control commands determined in response to the user input to the canopy controller configured to control operation of the fan via a first communication protocol;
    a second communication interface configured to communicate data associated with operation of the fan via a second communication protocol, wherein the first communication protocol is different from the second communication protocol;
    a light ring indicator configured to be illuminated in a manner indicative of the execution of the control commands by the fan system.

17. The in-wall controller of claim 16, wherein the interface element comprises one or more buttons.

18. The in-wall controller of claim 16, further comprising a power meter.

* * * * *